United States Patent
Tsuchiya

(10) Patent No.: US 9,680,663 B2
(45) Date of Patent: Jun. 13, 2017

(54) TUNNEL ENDPOINT DEVICE, COMMUNICATION DEVICE, COMMUNICATION SYSTEM, COMMUNICATION METHOD, AND PROGRAM

(71) Applicant: NEC Corporation, Tokyo (JP)

(72) Inventor: Koichi Tsuchiya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 47 days.

(21) Appl. No.: 14/659,460

(22) Filed: Mar. 16, 2015

(65) Prior Publication Data

US 2015/0263866 A1    Sep. 17, 2015

(30) Foreign Application Priority Data

Mar. 17, 2014  (JP) .................................. 2014-053673

(51) Int. Cl.
| | |
|---|---|
| H04L 12/50 | (2006.01) |
| H04L 12/46 | (2006.01) |
| G06F 9/455 | (2006.01) |

(52) U.S. Cl.
CPC ...... *H04L 12/4633* (2013.01); *G06F 9/45558* (2013.01); *H04L 12/4641* (2013.01); *G06F 2009/45595* (2013.01)

(58) Field of Classification Search
CPC combination set(s) only.
See application file for complete search history.

(56) References Cited

U.S. PATENT DOCUMENTS 8,762,501 B2 * 6/2014 Kempf ................ H04L 12/4633
                                                                   709/220
9,154,433 B2 * 10/2015 Koponen ............ G06F 9/45558

FOREIGN PATENT DOCUMENTS

| JP | 2005-57693 A | 3/2005 |
| JP | 2011-170157 A | 9/2011 |
| JP | 2013-26743 A | 2/2013 |

OTHER PUBLICATIONS

Nick McKeown et al., "OpenFlow: Enabling Innovation in Campus Networks," [online], [searched on Feb. 21, 2014], Internet <URL: http://archive.openflow.org/documents/openflow-wp-latest.pdf>.
"OpenFlow Switch Specification, Version 1.1.0. Implemented (Wire Protocol 0x02)," [online], [searched on Feb. 21, 2014], Internet <URL:http://archive.openflow.org/documents/openflow-spec-v1.1.0.pdf>.

* cited by examiner

*Primary Examiner* — Frank Duong
(74) *Attorney, Agent, or Firm* — McGinn IP Law Group, PLLC.

(57) ABSTRACT

A tunnel endpoint device includes a control unit configured to establish a communication tunnel with a tunnel endpoint device as a communication peer and an interface configured to access a storage device including communication state information about a tunnel communication. The control unit is configured to be adapted to take over state information about a tunnel communication of another tunnel endpoint device via the storage device when receiving an externally supplied switching instruction.

20 Claims, 28 Drawing Sheets

FIG.25

| TUNNEL STARTING POINT | TUNNEL ENDING POINT | SPI |
|---|---|---|
| ADDRESS A | ADDRESS D | 0xaaaaaaaa |
| SEQUENCE NUMBER | SEQUENCE NUMBER UPDATE TIME | |
| N | YYYY/MM/DD HH:MM:SS TTTTTTTT(0) | |
| SEQUENCE NUMBER | SEQUENCE NUMBER UPDATE TIME | |
| N+1 | YYYY/MM/DD HH:MM:SS TTTTTTTT(1) | |
| SEQUENCE NUMBER | SEQUENCE NUMBER UPDATE TIME | |
| N+2 | YYYY/MM/DD HH:MM:SS TTTTTTTT(2) | |
| ... | ... | |
| SEQUENCE NUMBER | SEQUENCE NUMBER UPDATE TIME | |
| N+M−1 | YYYY/MM/DD HH:MM:SS TTTTTTTT(M−1) | |
| SEQUENCE NUMBER | SEQUENCE NUMBER UPDATE TIME | |
| N+M | YYYY/MM/DD HH:MM:SS TTTTTTTT(M) | |

TUNNEL ENDPOINT DEVICE, COMMUNICATION DEVICE, COMMUNICATION SYSTEM, COMMUNICATION METHOD, AND PROGRAM

TECHNICAL FIELD

Reference to Related Application

The present invention is based upon and claims the benefit of the priority of Japanese patent application No. 2014-053673, filed on Mar. 17, 2014, the disclosure of which is incorporated herein in its entirety by reference thereto. The present invention relates to a tunnel endpoint device, a communication device, a communication system, a communication method, and a program. In particular, it relates to: a tunnel endpoint device and a communication device that perform a communication by using tunneling technology and encryption technology; a communication system; a communication method; and a program.

BACKGROUND

Patent Literature 1 discloses IPsec (Security Architecture for Internet Protocol) communication devices that perform a communication by establishing a secure path with IPsec. According to Patent Literature 1, when the communication is interrupted, the IPSEC communication devices are switched to an interruption mode so that either device performing the communication can re-establish the path and the time required to re-establish the path can be shortened.

In Patent Literature 1, security association (which will be referred to as SA) is performed as a procedure for securing an agreement about a data exchange method and protection method between devices performing an IPsec communication. A lifetime, a sequence number, and so on are included as parameters in the parameters of such SA of IPsec (see paragraph 0028 in Patent Literature 1). Other than the above IPsec, devices that perform communications by using a tunneling protocol such as GRE (Generic Routing Encapsulation) or GTP (GPRS Tunneling Protocol for User Plane) manage tunnel state information (for example, sequence numbers).

Patent Literature 2 discloses a configuration including: VPN packet transfer devices that transfer user packets via a common network; and a VPN controller that exchanges information about processing for transferring the user packets with nodes such as routers and terminals in user networks by using a user network control protocol such as a routing protocol. In addition, the VPN controller receives settings about packet filtering, traffic control, address conversion, and so on from a user as a system administrator and distributes these items of information to the VPN packet transfer devices.

Patent Literature 3 discloses a node (automatic network construction device) that performs identification information reception processing for receiving identification information on a C-plane from a neighboring node on a D-plane in a GMPLS network and tunnel setting processing for setting a communication tunnel for encapsulating and transmitting/receiving data via a cable connected to this neighboring node.

Non-Patent Literatures 1 and 2 are examples of a centralized-control-type network related to the present invention.

[Patent Literature 1]
Japanese Patent Kokai Publication No. JP2011-170157A
[Patent Literature 2]
Japanese Patent Kokai Publication No. JP2005-057693A
[Patent Literature 3]
Japanese Patent Kokai Publication No. JP2013-026743A Non Patent Literature

[Non-Patent Literature 1]
Nick McKeown, and seven others, "OpenFlow: Enabling Innovation in Campus Networks," [online], [searched on Feb. 21, 2014], Internet <URL: http://archive.openflow.org/documents/openflow-wp-latest.pdf>
[Non-Patent Literature 2]
"OpenFlow Switch Specification" Version 1.1.0 Implemented (Wire Protocol 0x02), [online], [searched on Feb. 21, 2014], Internet <URL: http://archive.openflow.org/documents/openflow-spec-v1.1.0.pdf>

SUMMARY

The following analyses are given by the present invention. As described in the above Patent Literature 1, each communication device (in the case of Patent Literature 1, each IPSEC communication device) uniquely manages tunnel state information (for example, a sequence number, a lifetime, and so on). Thus, there is a problem that it is difficult to cause another device to take over a communication via a tunnel. If takeover of tunnel state information is made possible, the tunnel communication can easily be switched to another device.

Patent Literature 2 has the same problem in this respect. While the VPN controller that exchanges information about processing for transferring user packets with other nodes and that distributes setting information about packet filtering, traffic control, address conversion, and so on to the VPN packet transfer devices is arranged, a tunnel between VPN packet transfer devices is configured independently.

Patent Literature 3 only discloses setting of a tunnel for encapsulating and transmitting/receiving control commands between nodes on the C-Plane.

It is an object of the present invention to provide a tunnel endpoint device, a communication device, a communication system, a communication method, and a program that can contribute to easily causing another device to take over a state of a communication via a tunnel.

According to a first aspect, there is provided a tunnel endpoint device, including: a control unit configured to establish a communication tunnel with a tunnel endpoint device as a communication peer; and an interface configured to access a storage device including communication state information about a tunnel communication; wherein the control unit is adapted to take over state information about a tunnel communication of another tunnel endpoint device via the storage device when receiving an externally supplied switching instruction.

According to a second aspect, there is provided a server, including: first means adapted to operate a plurality of virtual machines each of which is adapted to perform a tunnel communication with a communication peer; and second means adapted to switch virtual machines performing a predetermined tunnel communication; wherein the first means is adapted to allow a second virtual machine to take over state information about a tunnel communication of a first virtual machine when receiving an externally supplied switching instruction.

According to a third aspect, there is provided a controller that transmits a tunnel switching instruction to the above tunnel endpoint device.

According to a fourth aspect, there is provided a communication device, including: a communication unit configured to perform an encryption communication by using a specified encryption protocol with a first communication device; and an interface configured to access a storage device in which a second communication device that communicates with the first communication device writes information about an encryption communication including encryption protocol information; wherein the communication unit is adapted to continue an encryption communication with the first communication device in place of the second communication device by reading the information about the encryption communication from the storage device when receiving an externally supplied switching instruction.

According to a fifth aspect, there is provided a communication method, including steps of: causing a tunnel endpoint device, which includes a control unit configured to establish a communication tunnel with a tunnel endpoint device as a communication peer and an interface configured to access a storage device including communication state information about a tunnel communication, to receive an externally supplied communication tunnel switching instruction; and causing the tunnel endpoint device to take over state information about a tunnel communication of another tunnel endpoint device via the storage device when receiving the externally supplied switching instruction. This method is associated with a certain machine, namely, with a tunnel endpoint device that communicates, via a communication tunnel, with another tunnel endpoint device that faces the tunnel endpoint device.

According to a sixth aspect, there is provided a communication method, including steps of: causing a controller, which includes a management unit adapted to transmit an instruction to a first tunnel endpoint device adapted to perform a tunnel communication with a communication peer and a control unit adapted to control a second tunnel endpoint device via the management unit, to determine whether to instruct the second tunnel endpoint device to take over an operation of a tunnel communication; and causing the controller to instruct the second tunnel endpoint device to take over communication state information about the tunnel communication of the first tunnel endpoint device and the operation of the tunnel communication. This method is associated with a certain machine, namely, with a tunnel endpoint device that communicates, via a communication tunnel, with another tunnel endpoint device that faces the tunnel endpoint device.

According to a seventh aspect, there is provided a program, causing a computer, which includes a management unit adapted to transmit an instruction to a first tunnel endpoint device adapted to perform a tunnel communication with a communication peer and a control unit adapted to control a second tunnel endpoint device via the management unit, to perform processing for: determining whether to instruct the second tunnel endpoint device to take over an operation of a tunnel communication; and instructing the second tunnel endpoint device to take over communication state information about the tunnel communication of the first tunnel endpoint device and the operation of the tunnel communication. This program can be recorded in a computer-readable (non-transient) storage medium. Namely, the present invention can be embodied as a computer program product.

The meritorious effects of the present invention are summarized as follows. The present invention can contribute to easily causing another device to take over state information about a communication via a tunnel.

BRIEF DESCRIPTION OF THE DRAWINGS

FIG. 25 illustrates how sequence information is managed by a controller according to a seventh exemplary embodiment of the present invention.

PREFERRED MODES

Figure 1:
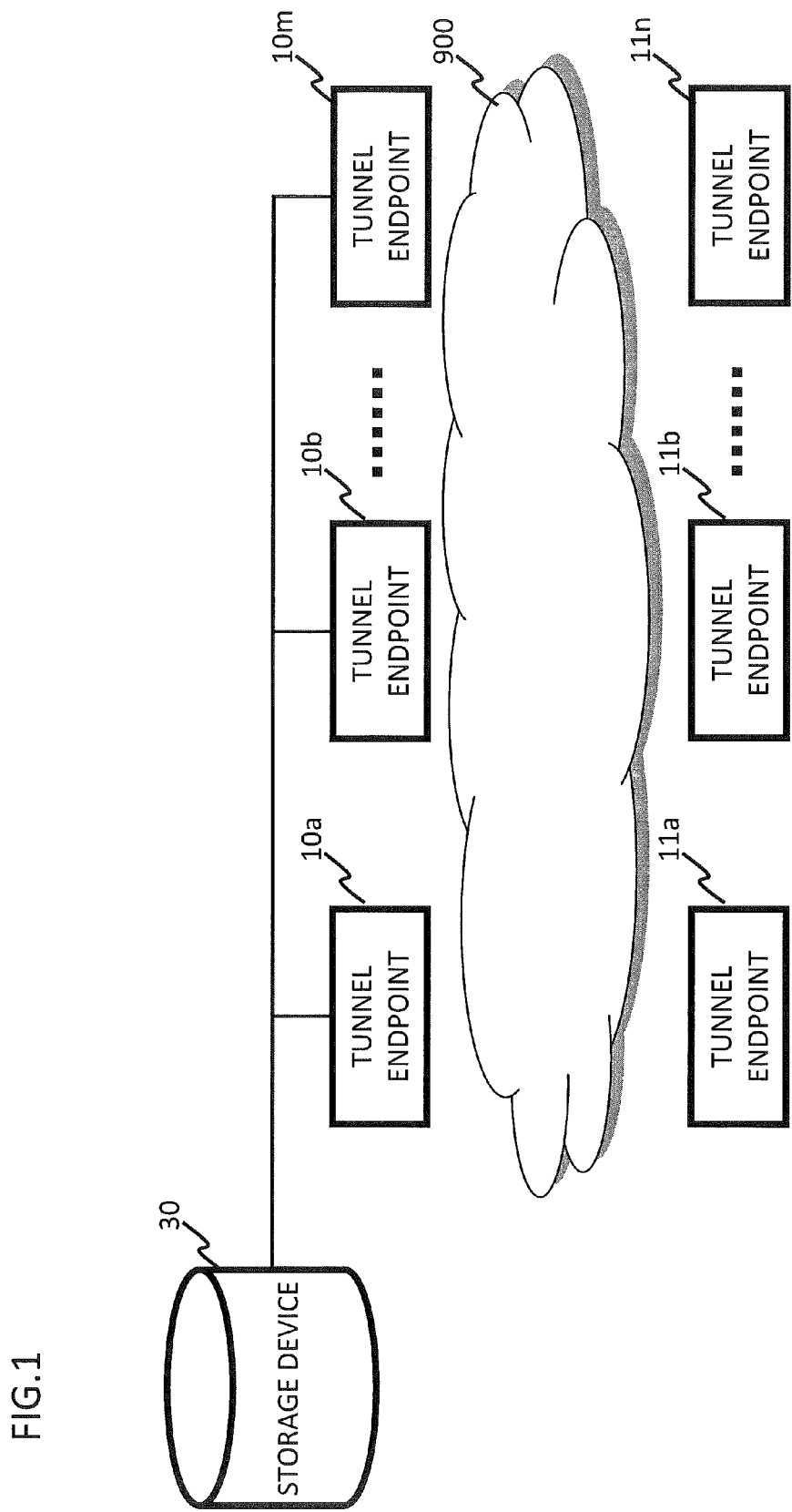
FIG. 1 illustrates a configuration according to a first exemplary embodiment of the present invention.

First, an outline of an exemplary embodiment of the present invention will be described with reference to FIGS. 1 and 2. In the following outline, various components are denoted by reference characters for the sake of convenience. Namely, the following reference characters are merely used as examples to facilitate understanding of the present invention. The description of the outline is not intended to limit the present invention to the illustrated modes.

An exemplary embodiment of the present invention can be realized by a tunnel endpoint device (for example, 10a in FIG. 1), which will simply be referred to as "a tunnel endpoint" as needed, including: a control unit (102 in FIG. 2) configured to establish a communication tunnel with a tunnel endpoint device as a communication peer (which is one of 11a to 11n in FIG. 1); and an interface (101 in FIG. 2) configured to access a storage device (30 in FIG. 1) including communication state information about a tunnel communication.

More specifically, the control unit (102 in FIG. 2) is configured to be adapted to take over state information about a tunnel communication of another tunnel endpoint device (one of 10b to 10m in FIG. 1) via the storage device (30 in FIG. 1) when receiving an externally supplied switching instruction.

In this way, state information about a communication being performed between certain tunnel endpoints can be taken over by another tunnel endpoint. In addition, by switching a tunnel communication to the another tunnel endpoint device by using the communication state information, the tunnel communication can be allowed to continue.

[First Exemplary Embodiment]

Next, a first exemplary embodiment of the present invention will be described in detail with reference to the drawings. FIG. 1 illustrates a configuration according to a first exemplary embodiment of the present invention. As illustrated in FIG. 1, m tunnel endpoints 10a to 10m and n tunnel endpoints 11a to 11n are arranged via a network 900.

The tunnel endpoints 10a to 10m are connected to a storage device 30 and can register or read status information which will be described below in or from the storage device 30. In FIG. 1, the tunnel endpoints 11a to 11n are not connected to the storage device 30. However, the tunnel endpoints 11a to 11n may also be connected to the storage device 30 or another storage device.

Figure 2:
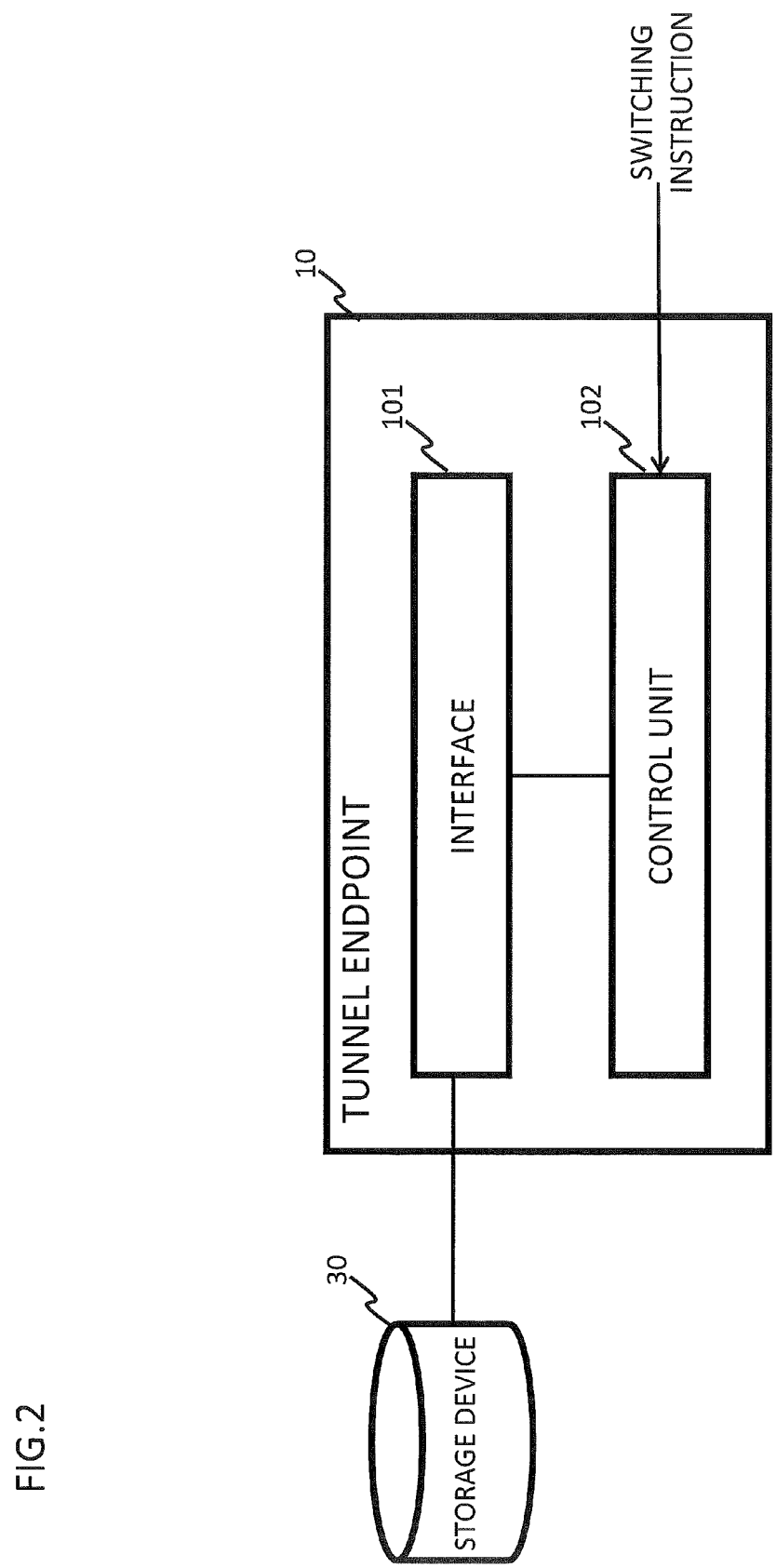
FIG. 2 illustrates a configuration of a tunnel endpoint device according to the first exemplary embodiment of the present invention.

FIG. 2 illustrates a configuration of a tunnel endpoint device according to the first exemplary embodiment of the present invention (when it is not necessary to distinguish the tunnel endpoints 10a to 10m from one another, any one of the tunnel endpoints 10a to 10m will be referred to as "a tunnel endpoint 10"). The configuration illustrated in FIG. 2 includes an interface 101 and a control unit 102.

The interface 101 is connected to the storage device 30, and the control unit 102 registers and reads communication state information in and from the storage device 30 via the interface 101.

The control unit 102 establishes a tunnel by performing negotiation with IKE (Internet Key Exchange) for determining an encryption key and an encryption/authentication algorithm for performing a device control operation and a tunnel communication with another tunnel endpoint. After establishing a tunnel, the control unit 102 also registers communication state information (information about a state of the communication via the tunnel) in the storage device 30 via the interface 101. When receiving an externally supplied tunnel switching instruction, the control unit 102 reads communication state information about the tunnel to which the switching instruction is directed from the storage device 30 and continues the communication by using the communication state information.

Examples of these tunnel endpoints include IPsec tunnel endpoints, GRE tunnel endpoints, and GTP tunnel endpoints. Other examples of these tunnel endpoints include P-GW (Packet Data Network Gateway) tunnel endpoints and S-GW (Serving Gateway) tunnel endpoints that establish tunnels in wireless communication networks. In such cases, bearer context data that is defined in 5.7 in 3GPP TS23.401 and that is managed by these devices for user terminals can be used as the communication state information registered in the storage device 30.

The storage device 30 is physically independent in FIG. 1. However, the storage device 30 may be arranged in an arbitrary manner, as long as the storage device 30 is accessible by each tunnel endpoint. For example, a storage device included in a certain tunnel endpoint may be configured to be read and written by other tunnel endpoints.

Figure 3:
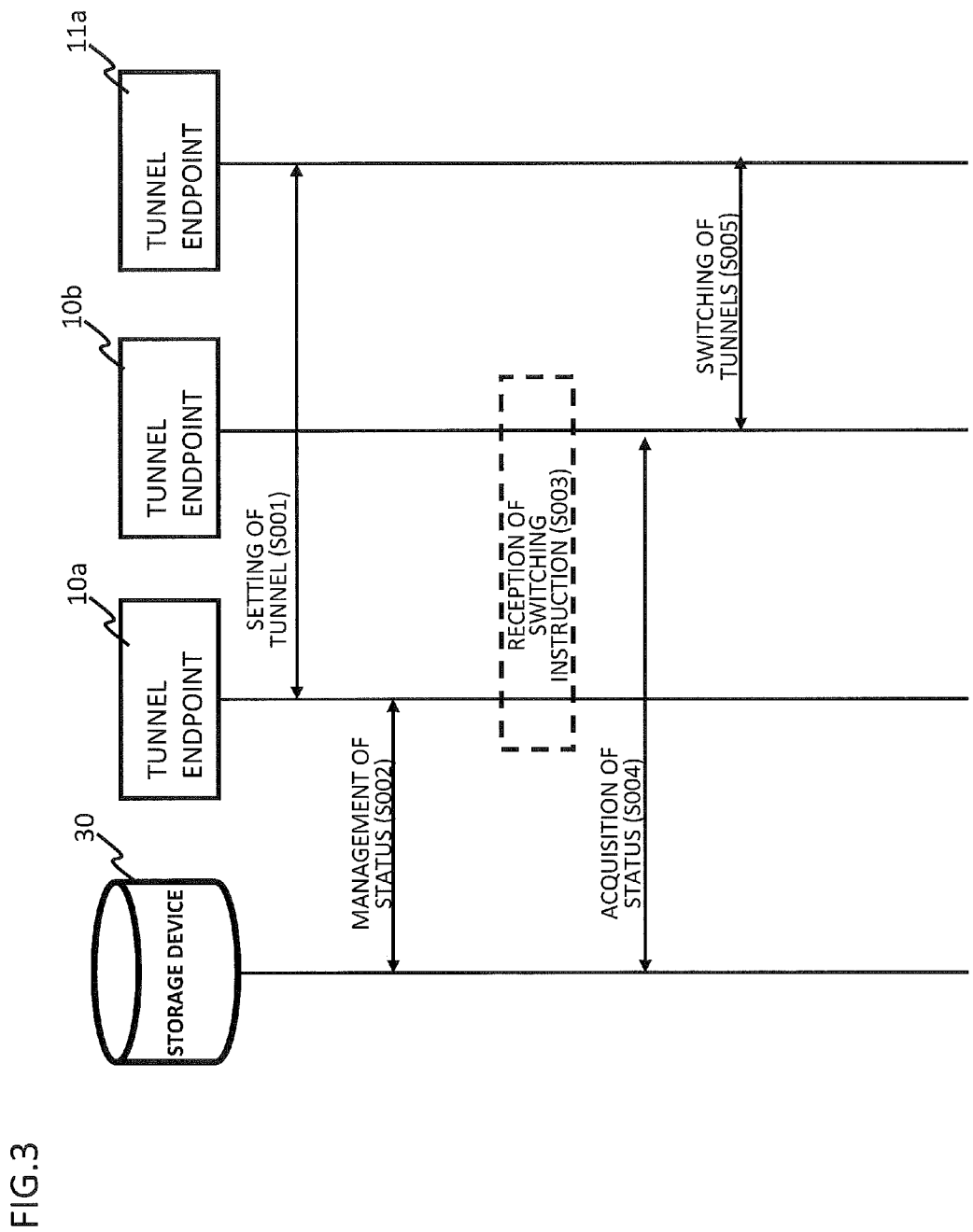
FIG. 3 is a sequence diagram illustrating an operation according to the first exemplary embodiment of the present invention.

Next, an operation according to the present exemplary embodiment will be described in detail with reference to the drawings. FIG. 3 is a sequence diagram illustrating an operation according to the first exemplary embodiment of the present invention. The following description will be made on the basis of an example where a communication being performed via a tunnel established between the tunnel endpoints 10a and 11a in FIG. 1 is switched, for example, because of a failure or for load balancing so that the communication is performed via a tunnel established between the tunnel endpoints 10b and 11a.

Figure 4:
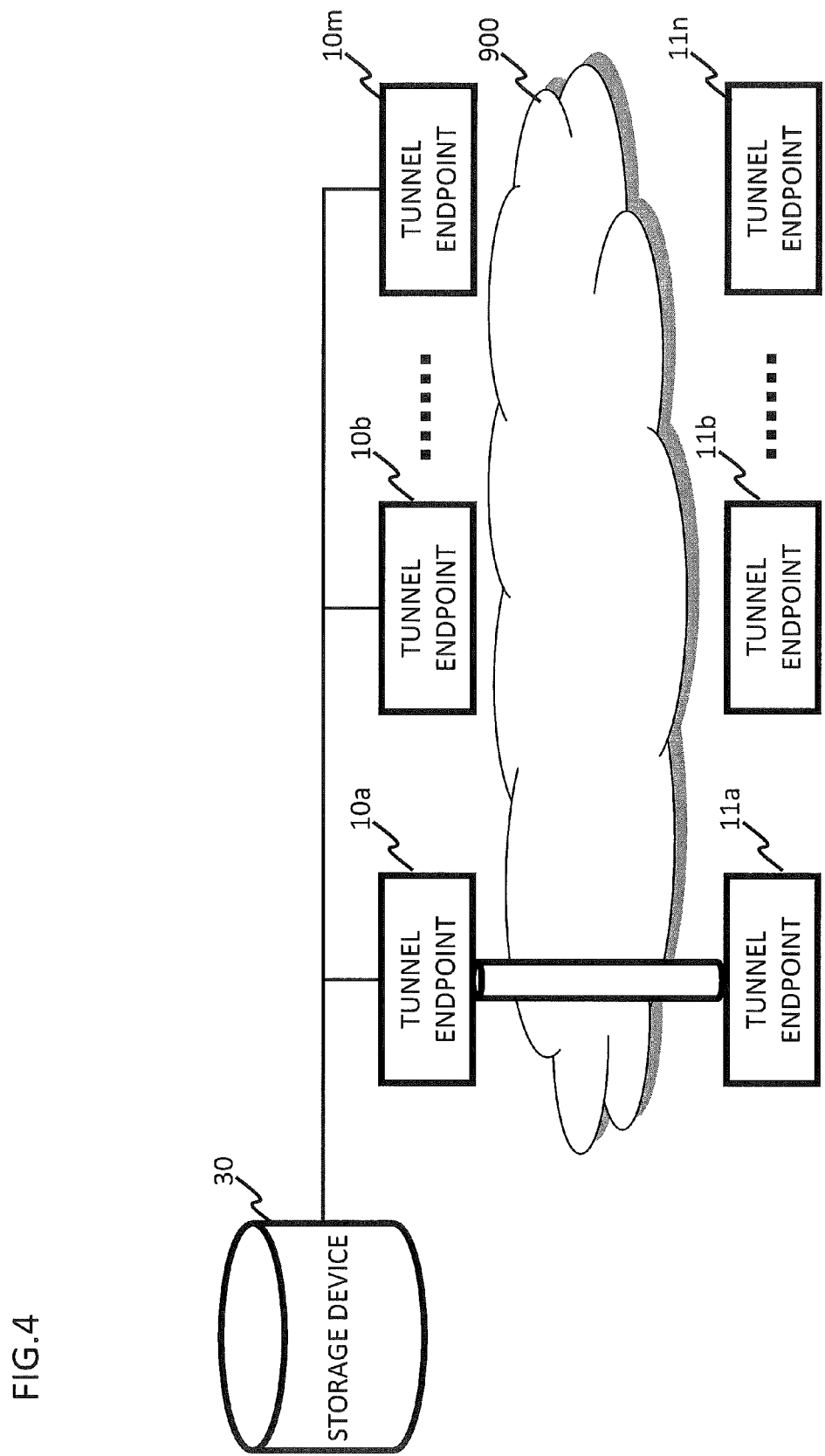
FIG. 4 illustrates an operation according to the first exemplary embodiment of the present invention.

As illustrated in FIG. 3, first, a negotiation is performed and a tunnel is set between the tunnel endpoints 10a and 11a (between first and second tunnel endpoints) (step S001). FIG. 4 illustrates a state in which a tunnel is set between the tunnel endpoints 10a and 11a.

The tunnel endpoint 10a (the second tunnel endpoint) registers communication state information about the tunnel in the storage device 30 (step S002; MANAGEMENT OF STATUS).

Next, when a tunnel switching instruction is inputted to the tunnel endpoints 10a and 10b, the tunnel endpoint 10b acquires communication state information about the tunnel specified by the switching instruction from the storage device 30 (step S004; ACQUISITION OF STATUS).

Figure 5:
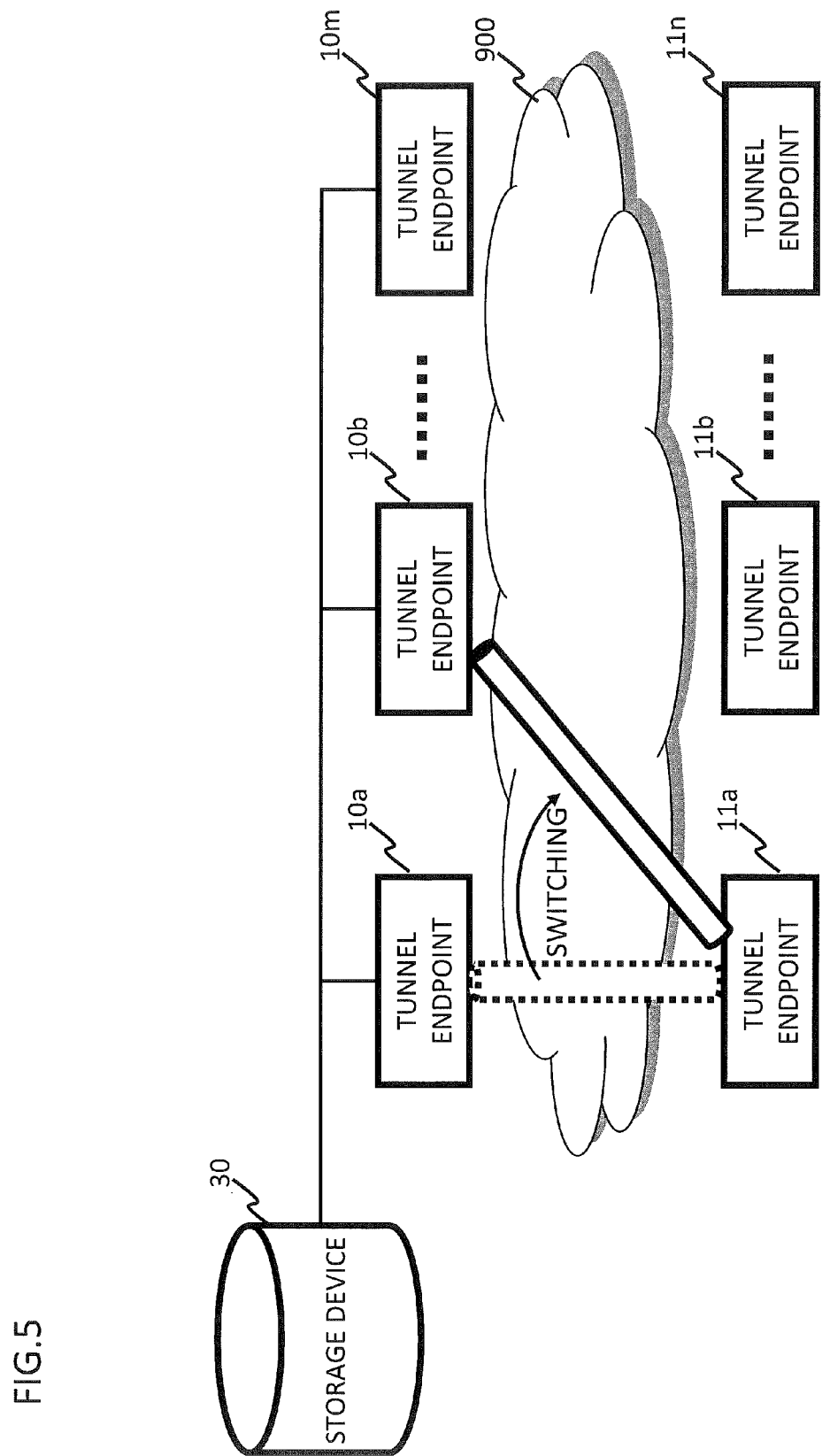
FIG. 5 illustrates the operation according to the first exemplary embodiment of the present invention.

In addition, the tunnel endpoint 10b uses the acquired communication state information to set a tunnel that extends to the tunnel endpoint 11a (the first tunnel endpoint) and to continue the communication that has been performed between the tunnel endpoints 10a and 11a (step S005; SWITCHING OF TUNNELS). In contrast, when this switching is performed, the tunnel endpoint 10a discontinues the communication with the tunnel endpoint 11a. FIG. 5 illustrates a state in which a tunnel is set between the tunnel endpoints 10b and 11a, namely, tunnel switching has been performed.

In this way, according to the present exemplary embodiment, a communication being performed between certain tunnel endpoints is allowed to continue by switching one of the tunnel endpoints to another tunnel endpoint.

[Second Exemplary Embodiment]

Next, a second exemplary embodiment will be described. In the second exemplary embodiment, a device (controller) for transmitting the above tunnel switching instruction is added. Since the present exemplary embodiment can be realized by a configuration similar to that according to the first exemplary embodiment, the following description will be made with a focus on the differences.

Figure 6:
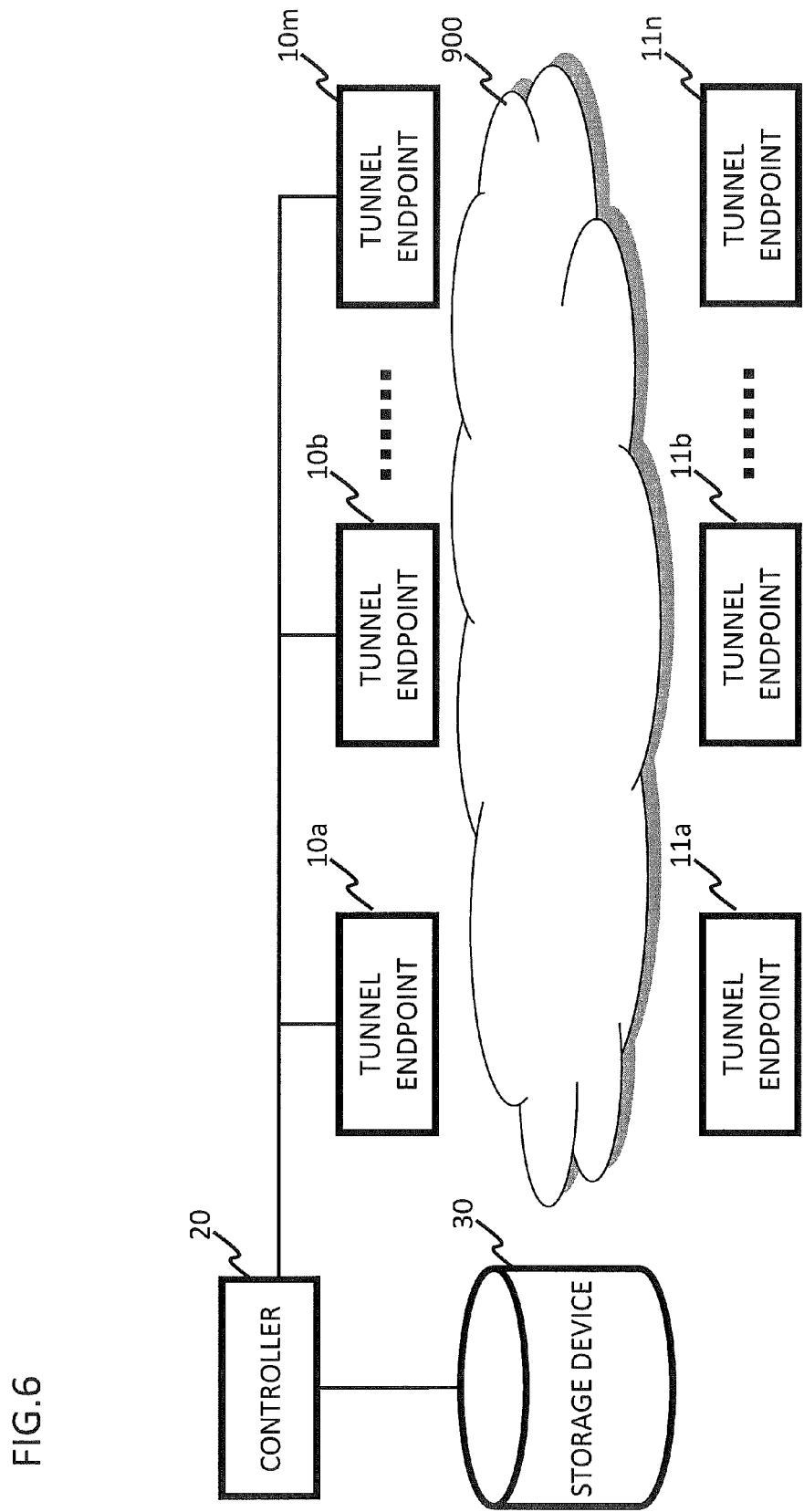
FIG. 6 illustrates a configuration according to a second exemplary embodiment of the present invention.

FIG. 6 illustrates a configuration according to the second exemplary embodiment of the present invention. The second exemplary embodiment differs from the first exemplary embodiment illustrated in FIG. 1 in that a controller (control device) 20 that manages communication tunnels among the tunnel endpoints is arranged between the storage device 30 and the tunnel endpoints 10a to 10m.

Figure 7:
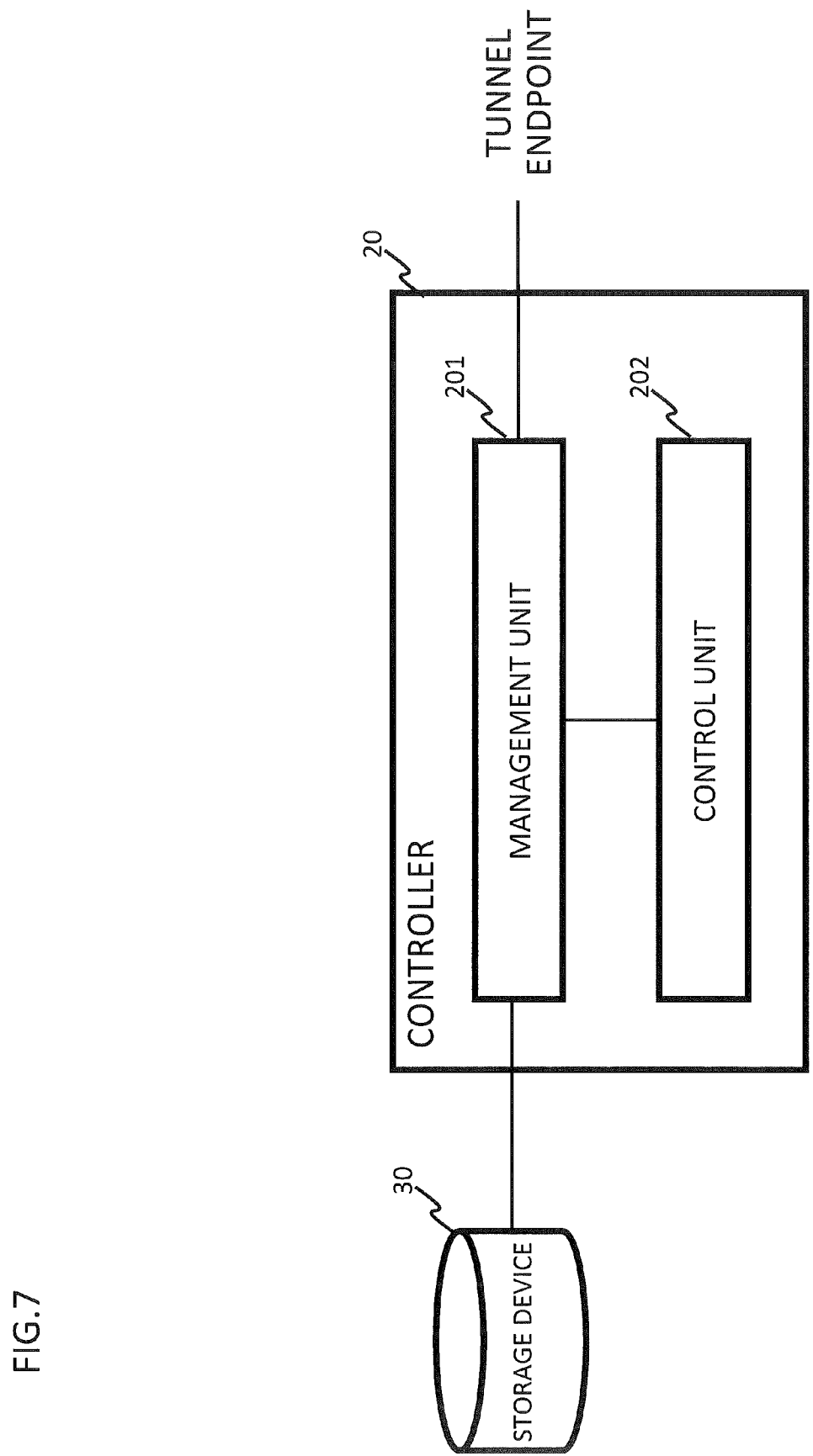
FIG. 7 illustrates a configuration of a controller (control device) according to the second exemplary embodiment of the present invention.

FIG. 7 illustrates a configuration of the controller 20 according to the second exemplary embodiment of the present invention. As illustrated in FIG. 7, the configuration includes a management unit 201 and a control unit 202.

The management unit 201 manages the tunnel endpoints 10 and tunnels. More specifically, the management unit 201 manages the tunnel endpoints 10 by using tunnel endpoint IDs (TEIDs) and the like and manages statuses of the tunnels set among these tunnel endpoints 10.

The control unit 202 determines whether to switch tunnels on the basis of such tunnel statuses acquired via the management unit 201 and of a predetermined communication policy. If the control unit 202 determines that tunnels needs to be switched, the control unit 202 notifies the management unit 201 of the tunnel endpoints corresponding to the tunnels to be switched and causes the management unit 201 to transmit a tunnel switching instruction.

The communication policy for determining whether to switch tunnels may be a communication policy for determining whether to switch tunnels and another tunnel endpoint to be newly used on the basis of at least one of the load, traffic, power consumption, and presence or absence of a failure of each tunnel endpoint, for example. For example, if the load or traffic of a tunnel endpoint located at an end of a tunnel is larger, the load or traffic can be leveled by switching this tunnel endpoint to another tunnel endpoint. For example, if it is possible to reduce the power consumption of a tunnel endpoint located at an end of a tunnel by switching the tunnel endpoint to another tunnel endpoint, the control unit 202 makes such determination. If a failure is caused in a tunnel endpoint located at an end of a tunnel, the control unit 202 determines to switch this tunnel endpoint to another tunnel endpoint in which no failure is caused. Of course, whether to switch tunnels and a tunnel endpoint to be newly used may be determined by combining two or more of the above conditions.

The storage device 30 according to the present exemplary embodiment is physically independent in FIG. 2. However, the storage device 30 may be arranged in an arbitrary manner, as long as the storage device 30 is accessible by the controller 20. For example, an auxiliary storage device included in the controller 20 may be used as the storage device 30.

Figure 8:
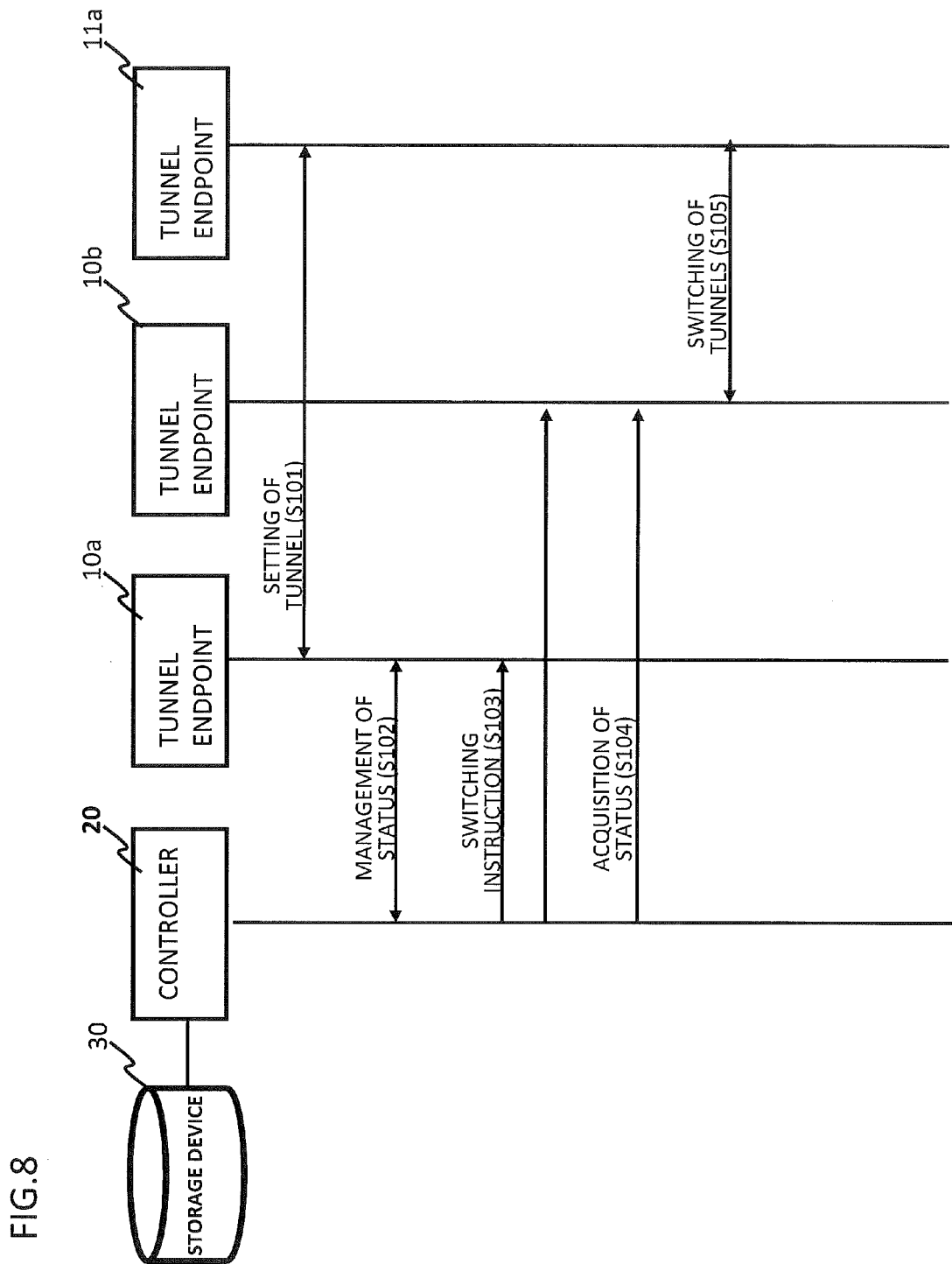
FIG. 8 is a sequence diagram illustrating an operation according to the second exemplary embodiment of the present invention.

Next, an operation according to the present exemplary embodiment will be described in detail with reference to the drawings. FIG. 8 is a sequence diagram illustrating an operation according to the second exemplary embodiment of the present invention. As in the first exemplary embodiment, the following description will be made on the basis of an example where a communication being performed via a tunnel established between the tunnel endpoints 10a and 11a in FIG. 6 is switched, for example, because of a failure or for load balancing so that the communication is performed via a tunnel established between the tunnel endpoints 10b and 11a.

As illustrated in FIG. 8, first, a negotiation is performed and a tunnel is set between the tunnel endpoints 10a and 11a (step S101).

The tunnel endpoint 10a transmits communication state information about the tunnel to the controller 20. The controller 20 manages the received communication state information by using the storage device 30 (step S102; MANAGEMENT OF STATUS).

Next, the controller 20 determines whether to switch the tunnels on the basis of the updated communication state information and the above communication policy. The following description will be made assuming that the controller 20 determines that the tunnel between the tunnel endpoints 10a and 11a needs to be switched to a tunnel between the tunnel endpoints 10b and 11a. Thus, the controller 20 transmits a tunnel switching instruction to the tunnel endpoints 10a and 10b (step S103).

When receiving the tunnel switching instruction, the tunnel endpoint 10b acquires communication state information about the tunnel specified by the switching instruction from the controller 20 (step S104; ACQUISITION OF STATUS). The controller 20 may transmit the communication state information along with the tunnel switching instruction.

In addition, the tunnel endpoint 10b uses the acquired communication state information to set a tunnel that extends to the tunnel endpoint 11a and to continue the communication that has been performed between the tunnel endpoints 10a and 11a (step S105; SWITCHING OF TUNNELS). In contrast, when this switching is performed, the tunnel endpoint 10a discontinues the communication with the tunnel endpoint 11a.

In this way, according to the present exemplary embodiment, switching of tunnels can be controlled dynamically on the basis of the communication status and the communication policy.

[Third Exemplary Embodiment]

Next, a third exemplary embodiment will be described. In the third exemplary embodiment, the controller transmits a switching notification not only to the tunnel endpoints on its own side but also to a tunnel endpoint that has communicated with a tunnel endpoint to be switched. Since the present exemplary embodiment can be realized by a configuration similar to that according to the second exemplary embodiment, the following description will be made with a focus on the differences.

Figure 9:
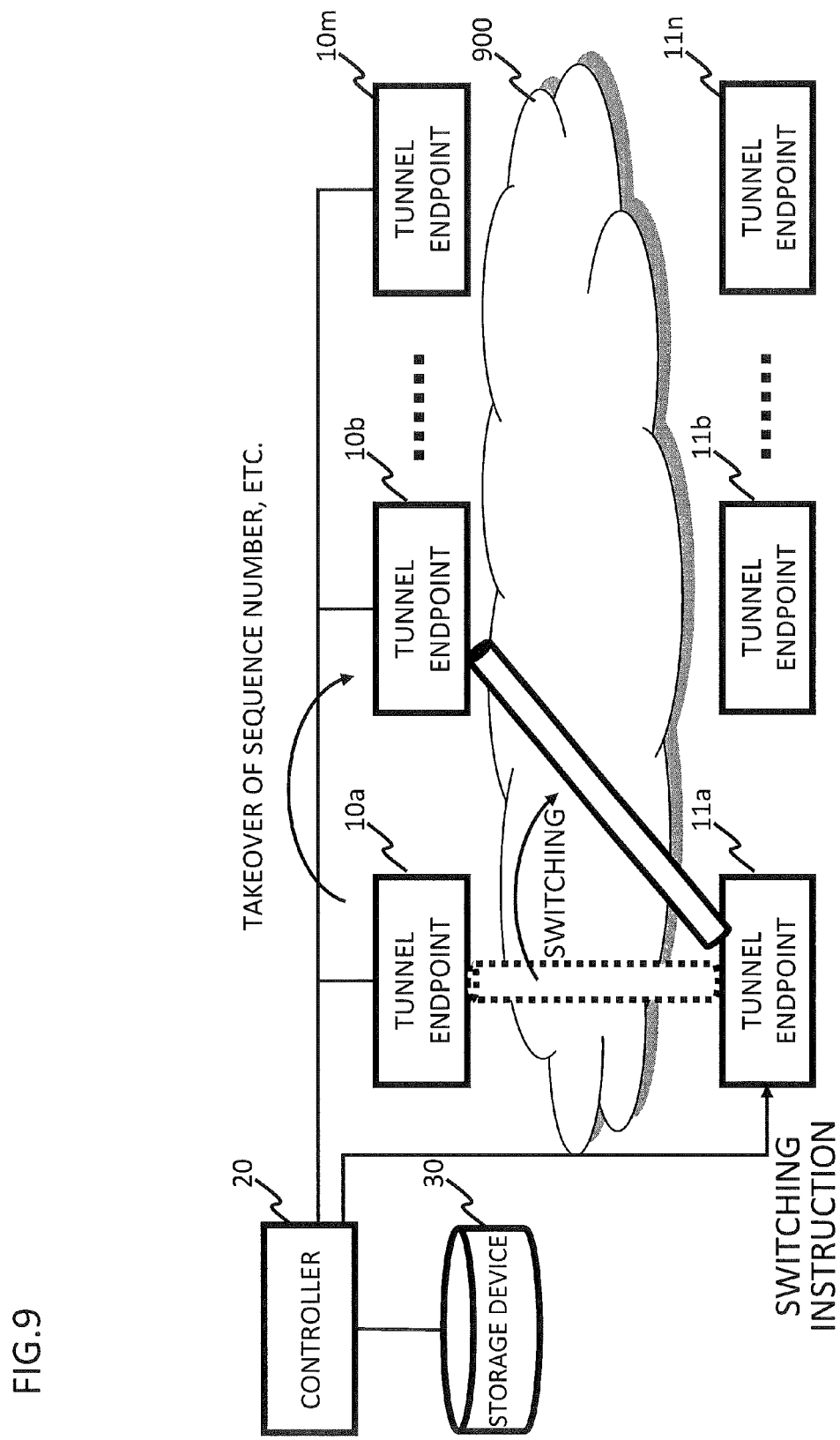
FIG. 9 illustrates a configuration and an operation according to a third exemplary embodiment of the present invention.

FIG. 9 illustrates a configuration according to the third exemplary embodiment of the present invention. The third exemplary embodiment differs from the second exemplary embodiment illustrated in FIG. 6 in that the controller 20 can transmit a switching instruction to the tunnel endpoint 11a as well. Information representing change of the tunnel destination address and the like can be included in the switching instruction.

Figure 10:
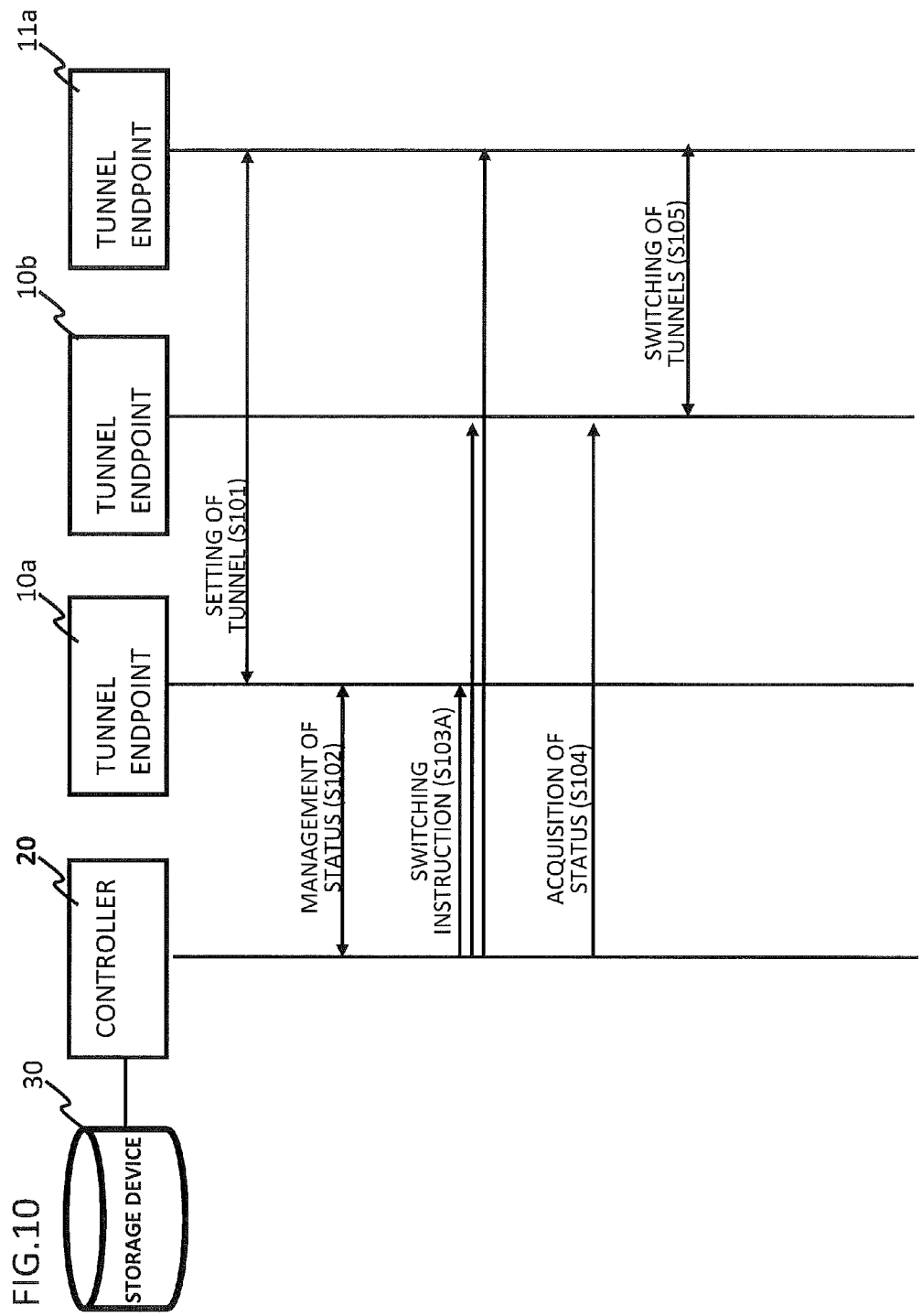
FIG. 10 is a sequence diagram illustrating the operation according to the third exemplary embodiment of the present invention.

FIG. 10 is a sequence diagram illustrating an operation according to the third exemplary embodiment of the present invention. The basis operation is the same as that according to the second exemplary embodiment. However, this operation differs in that in step S103A the controller 20 transmits a switching instruction to the tunnel endpoint 11a as well.

As described above, by notifying the tunnel endpoints located at both ends of each tunnel before and after the switching of change of the tunnel destination address and the like, switching of the tunnels in step S105 can be performed more quickly. Of course, as in the second exemplary embodiment, since the communication state information such as sequence numbers are taken over, the communication that has been performed between the tunnel endpoints 10a and 11a can be allowed to continue.

Figure 11:
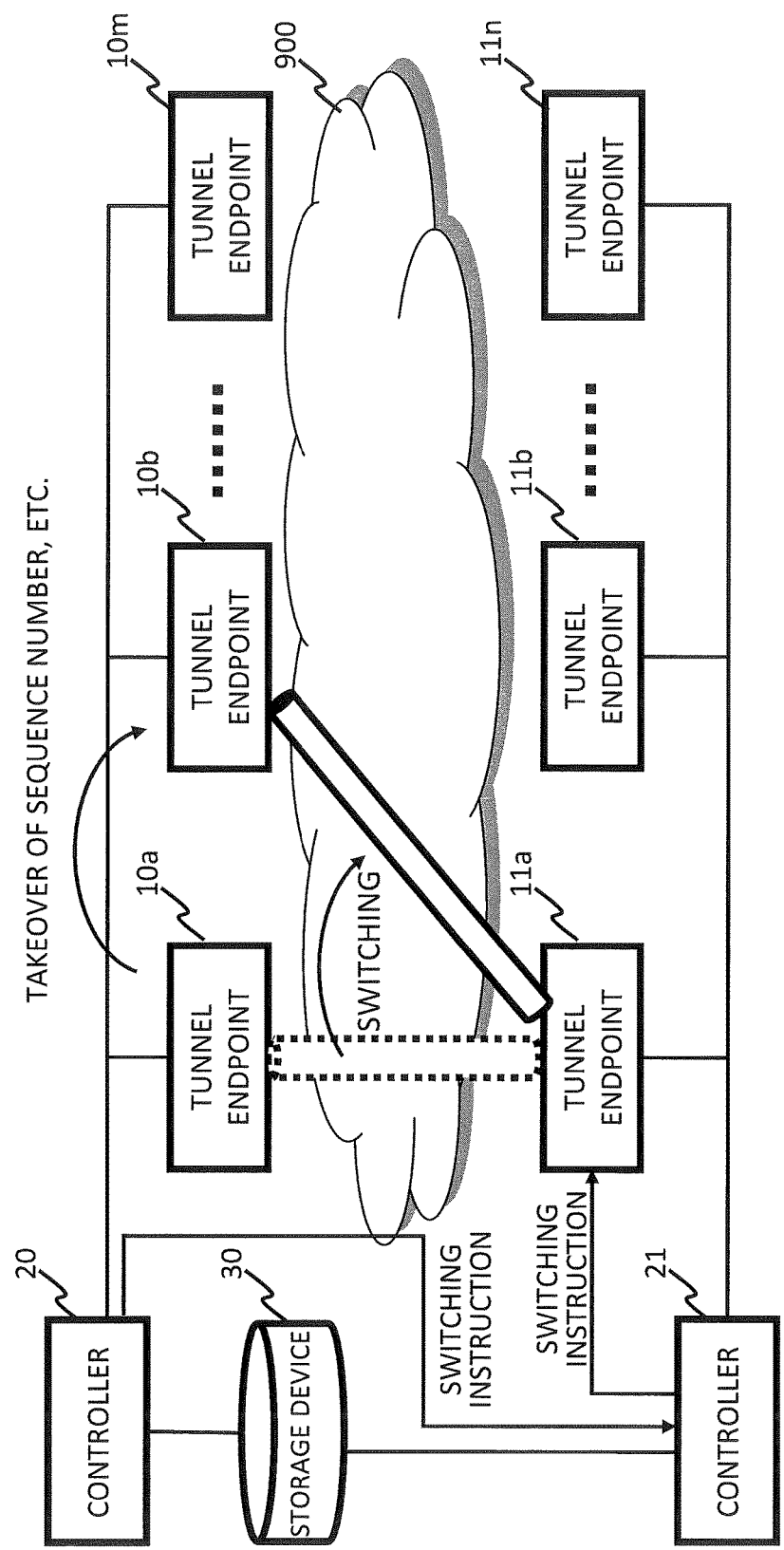
FIG. 11 illustrates another configuration and operation according to the third exemplary embodiment of the present invention.

As illustrated in FIG. 11, the present exemplary embodiment can be realized by a configuration including a second controller 21 that manages the tunnel endpoints 11a to 11n. In such case, the controller 20 transmits a switching instruction to the second controller 21, and the second controller 21 transmits the switching instruction to the tunnel endpoint 11a and the like.

In the operation in FIG. 11, the tunnel endpoint 10a is switched to the tunnel endpoint 10b. However, with the configuration in FIG. 11, the tunnel endpoint 11a can be switched to the tunnel endpoint 11b. In such case, contrary to the operation in FIG. 11, the second controller 21 transmits a switching instruction to the controller 20, and the controller 20 transmits the switching instruction to the tunnel endpoint 10a and the like. While the controller 20 and the second controller 21 are connected to the same storage device 30 in FIG. 11, each of these controllers 20 and 21 may use a different storage device.

[Fourth Exemplary Embodiment]

Next, a fourth exemplary embodiment will be described. In the fourth exemplary embodiment, for example, an OpenFlow switch described in Non-Patent Literatures 1 and 2 is used so that a tunnel endpoint whose communication peer is changed by tunnel switching does not need to recognize the tunnel switching. Since the present exemplary embodiment can be realized by a configuration similar to that according to the second exemplary embodiment, the following description will be made with a focus on the differences.

Figure 12:
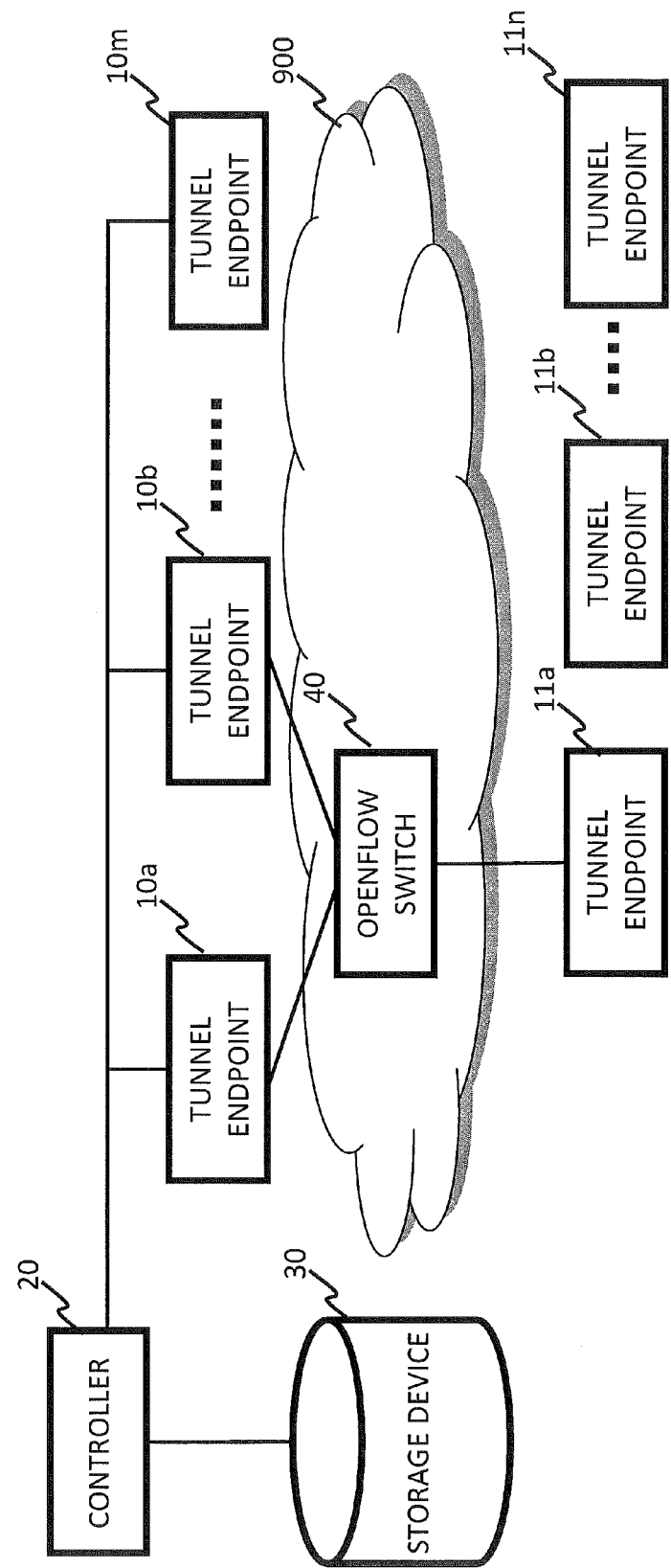
FIG. 12 illustrates a configuration according to a fourth exemplary embodiment of the present invention.

FIG. 12 illustrates a configuration according to the fourth exemplary embodiment of the present invention. The fourth exemplary embodiment differs from the second exemplary embodiment illustrated in FIG. 6 in that an OpenFlow switch 40 is arranged between the groups of tunnel endpoints.

Figure 13:
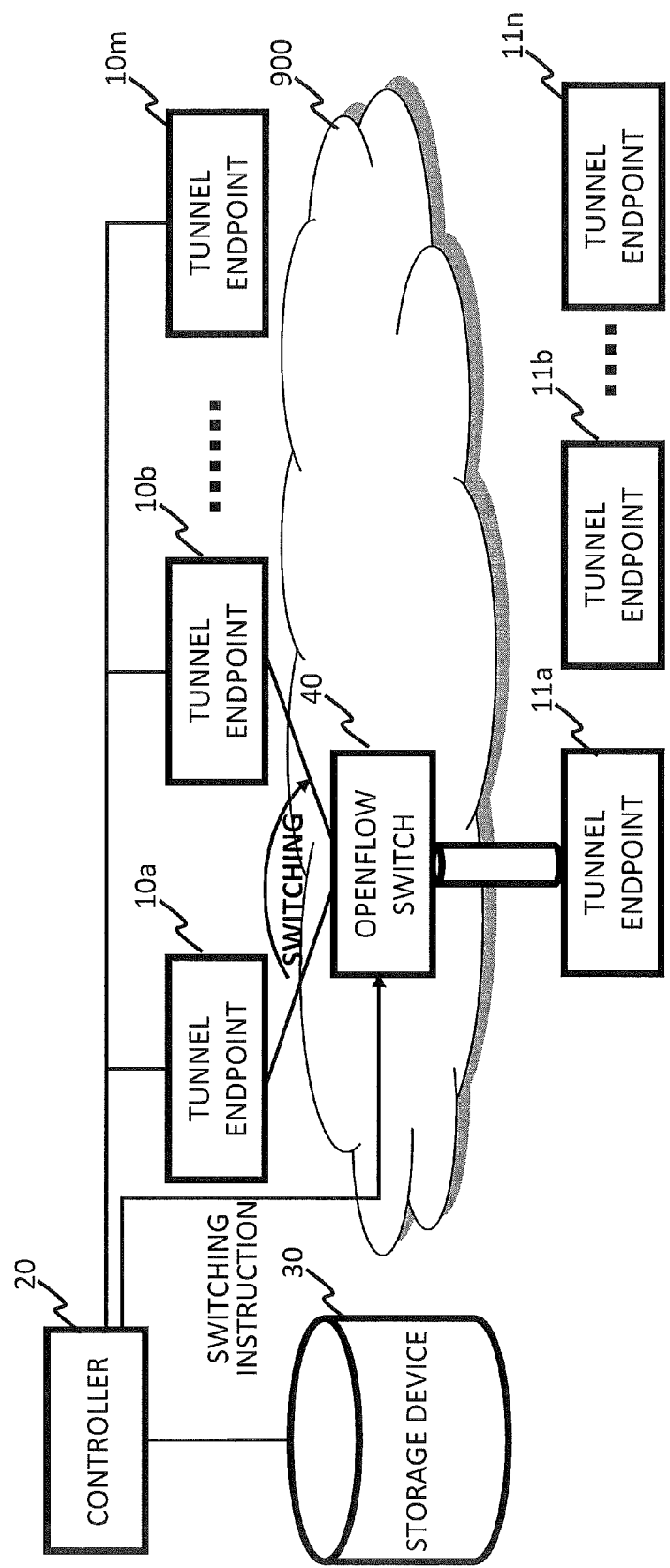
FIG. 13 illustrates an operation according to the fourth exemplary embodiment of the present invention.

As illustrated in FIG. 13, when switching tunnels, the controller according to the present exemplary embodiment instructs the OpenFlow switch 40, instead of the tunnel endpoint 11a, to change the tunnel endpoint serving as the forwarding destination of the corresponding communication. More specifically, the controller 20 instructs the OpenFlow switch 40 about tunnel switching by setting a flow entry in the OpenFlow switch 40, the flow entry defining at least one matching condition for determining the corresponding communication and at least one processing content (action) specifying change of the forwarding destination.

In addition, as in the second exemplary embodiment, in the present exemplary embodiment as well, the tunnel endpoint 10b can take over the communication state information such as sequence numbers by causing the controller 20 to transmit a switching instruction to the tunnel endpoint 10b.

Thus, according to the present exemplary embodiment, tunnel switching can be performed without having the tunnel endpoint 11a serving as a communication peer to recognize that tunnel switching is performed. The above description has been made on the basis of an example where the OpenFlow switch 40 is used. However, an arbitrary device other than the OpenFlow switch 40 may be used, as long as the device has an equivalent function.

[Fifth Exemplary Embodiment]

Next, a fifth exemplary embodiment will be described. In the fifth exemplary embodiment, tunnel endpoints virtualized by virtualization technology are used. Since the present exemplary embodiment can be realized by a configuration similar to that according to the fourth exemplary embodiment, the following description will be made with a focus on the differences.

Figure 14:
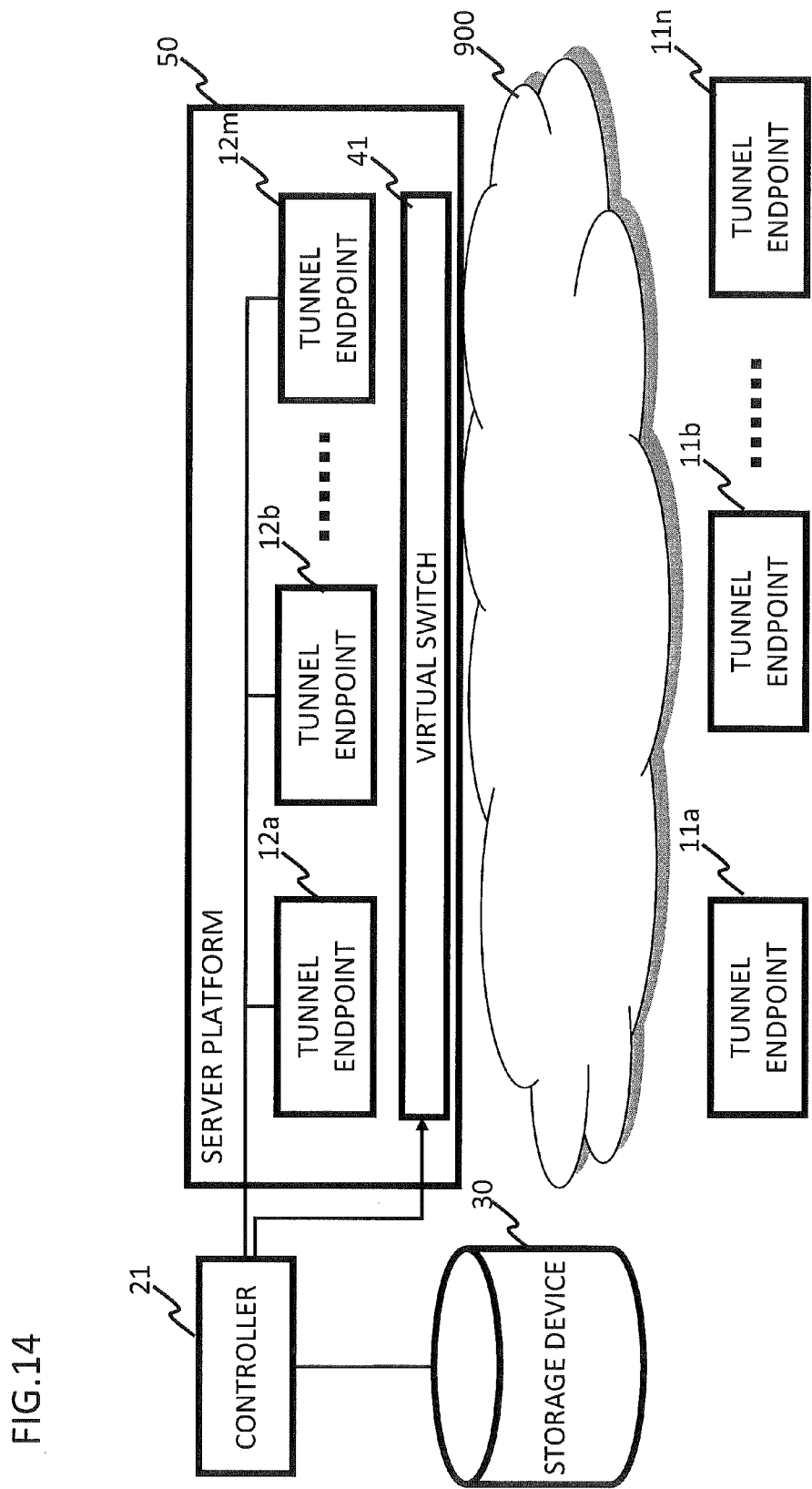
FIG. 14 illustrates a configuration according to a fifth exemplary embodiment of the present invention.

FIG. 14 illustrates a configuration according to the fifth exemplary embodiment of the present invention. The fifth exemplary embodiment differs from the fourth exemplary embodiment illustrated in FIG. 12 in that the tunnel endpoints 10a to 10m and the OpenFlow switch 40 according to the fourth exemplary embodiment are replaced by (virtual) tunnel endpoints 12a to 12m and a virtual switch 41 that operate on a (virtual) server platform 50.

Figure 15:
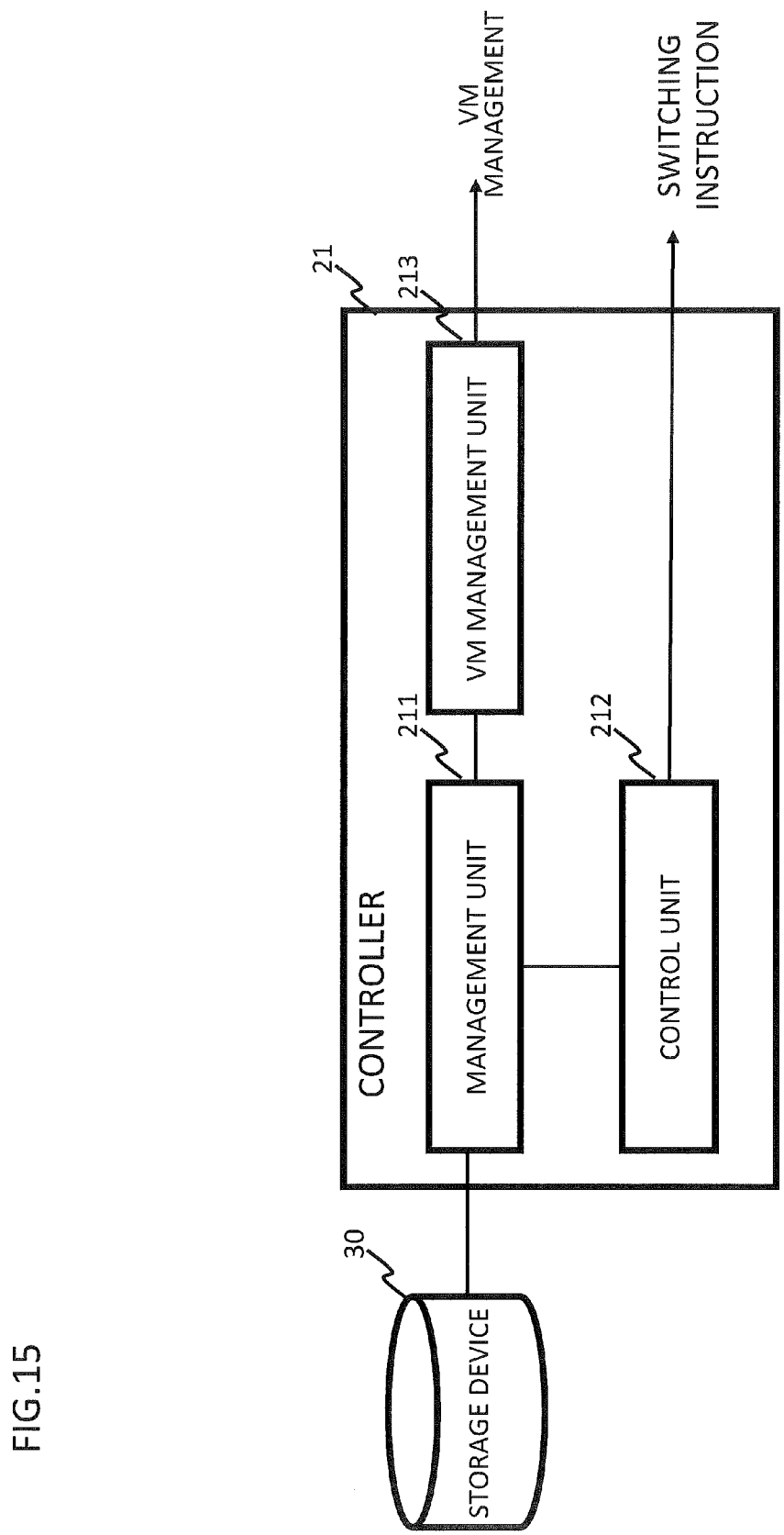
FIG. 15 illustrates a configuration of a controller (control device) according to the fifth exemplary embodiment of the present invention.

FIG. 15 illustrates a configuration of a controller 21 according to the present exemplary embodiment. As illustrated in FIG. 15, the controller 21 includes a VM management unit 213 in addition to the configuration of the controller 20 according to the second exemplary embodiment illustrated in FIG. 7.

A management unit 211 in the controller 21 according to the present exemplary embodiment collects information about the (virtual) tunnel endpoints 12a to 12m via the VM management unit 213 to manage the tunnel endpoints and tunnels by using the storage device 30. In this way, this management unit 211 functions as second means capable of switching virtual machines performing predetermined tunnel communications.

The VM management unit 213 provides the management unit 211 with the information about the (virtual) tunnel endpoints 12a to 12m that operate on the server platform 50. In addition, the VM management unit 213 controls the tunnel endpoints 12a to 12m and tunnels on the basis of instructions from the management unit 211. In this way, this VM management unit 213 functions as first means capable of operating a plurality of virtual machines (corresponding to the (virtual) tunnel endpoints 12a to 12m) capable of tunnel communications with communication peers. When receiving an externally supplied switching instruction, the VM management unit 213 performs an operation so that tunnel communication state information about any one of the (virtual) tunnel endpoints 12a to 12m is taken over by any one of the other (virtual) tunnel endpoints. Other than one of the (virtual) tunnel endpoints 12a to 12m in FIG. 17, a (virtual) tunnel endpoint started by the VM management unit 213 ex post facto may be used as such (virtual) tunnel endpoint that takes over the state information.

The control unit 212 determines whether to switch tunnels on the basis of a tunnel status acquired via the management unit 211 and a predetermined communication policy. If the control unit 212 determines that tunnels needs to be switched, the control unit 212 transmits a tunnel switching instruction to the virtual switch 41 and the management unit 211.

As described in the fourth exemplary embodiment, the tunnel switching instruction transmitted to the virtual switch 41 specifies change of the tunnel endpoint serving as the forwarding destination of the corresponding communication. The tunnel switching instruction transmitted to the management unit 211 specifies that takeover of the corresponding tunnel status information needs to be performed via the VM management unit 213. In addition, as needed, activation, termination, or migration of a tunnel endpoint may be specified.

Figure 16:
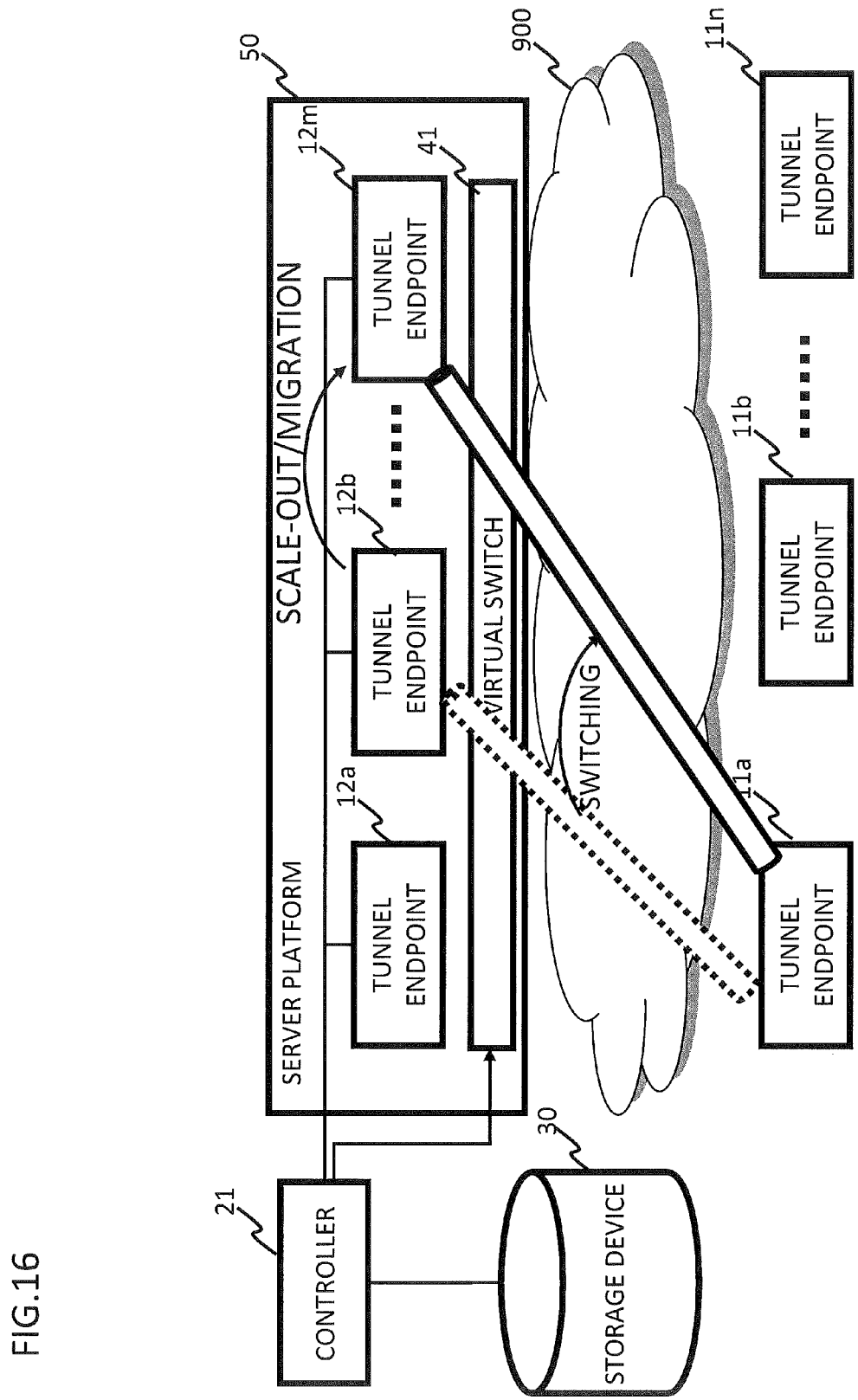
FIG. 16 illustrates an operation according to the fifth exemplary embodiment of the present invention.

In this way, according to the present exemplary embodiment, as illustrated in FIG. 16, tunnels can be switched as in the fourth exemplary embodiment. In addition, scale-out/scale-in can be performed by adding a tunnel endpoint or movement (migration) of a tunnel endpoint can be performed from various viewpoints. When determining whether to perform any one of such operations, for example, the control unit 212 can use at least one of the load, traffic, power consumption, and presence or absence of a failure of each (virtual) tunnel endpoint, as a condition.

Of course, in the present exemplary embodiment as well, as in the third exemplary embodiment, the corresponding one of the tunnel endpoints 11a to 11n that is to use a switching target tunnel can be notified of change of the tunnel destination address and the like.

In addition, as with the tunnel endpoints 12a to 12m in FIG. 16, the tunnel endpoints 11a to 11n in FIG. 16 can be configured as (virtual) tunnel endpoints.

Figure 17:
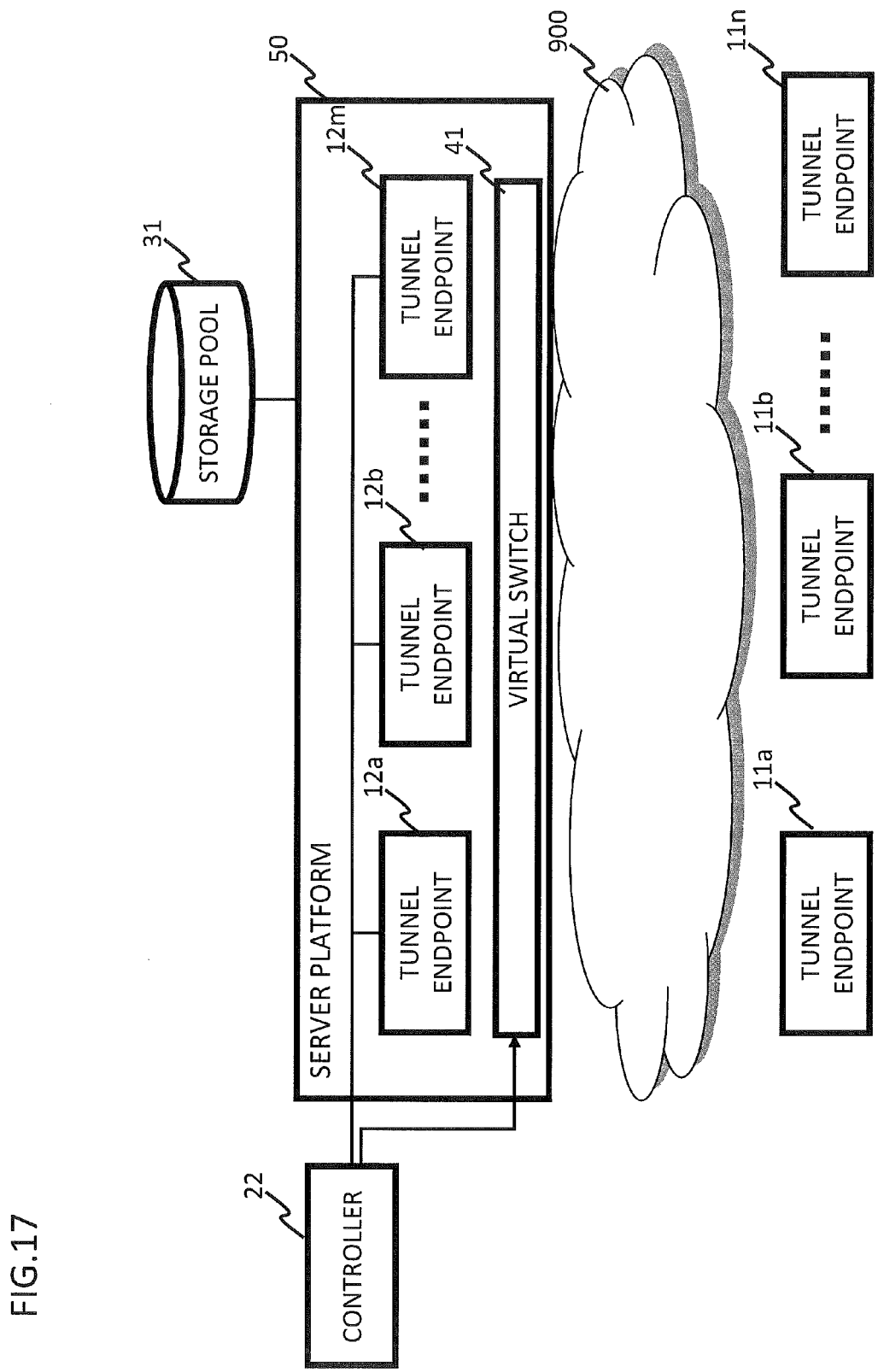
FIG. 17 illustrates another configuration according to the fifth exemplary embodiment of the present invention.
Figure 18:
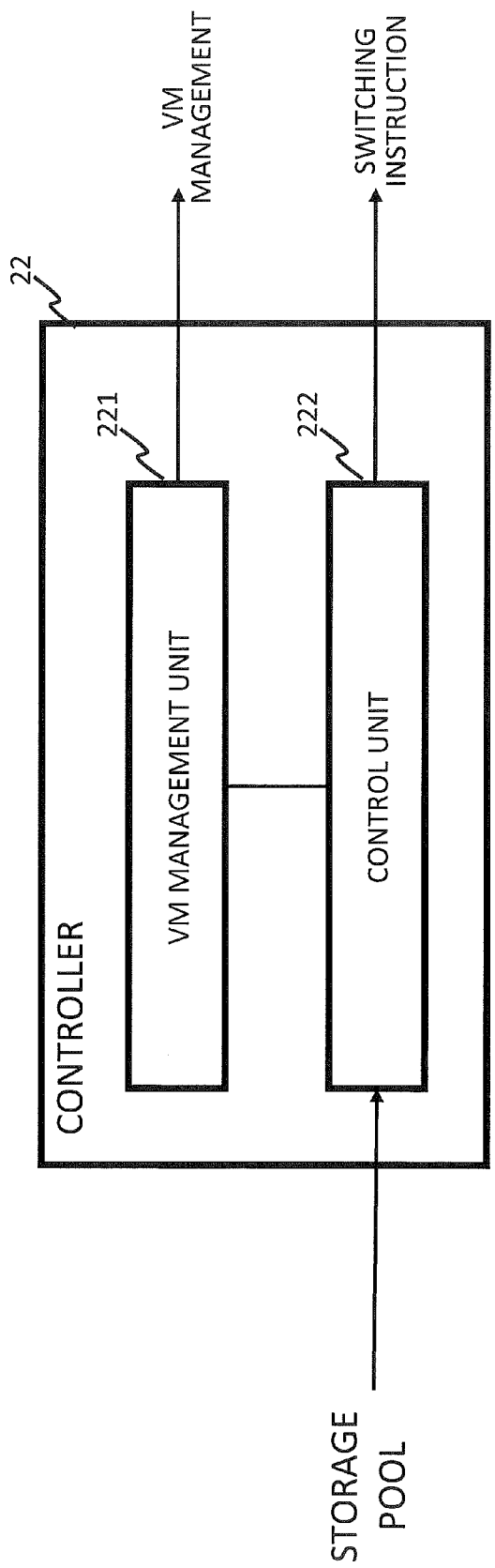
FIG. 18 illustrates another configuration of the controller (control device) according to the fifth exemplary embodiment of the present invention.

As illustrated in FIG. 17, the present exemplary embodiment can be realized by a configuration including a storage pool 31 storing tunnel communication state information, instead of the storage device. In such case, each of the tunnel endpoints 12a to 12m can write and read communication state information in and from the storage pool 31 without accessing a controller 22. Thus, as illustrated in FIG. 18, the management unit can be removed from the controller 22. With the configuration in FIG. 18, a control unit 222 in the controller 22 reads information registered by the tunnel endpoints under the management from the storage pool 31 to determine whether to perform tunnel switching or scale-out/scale-in.

[Sixth Exemplary Embodiment]

Figure 19:
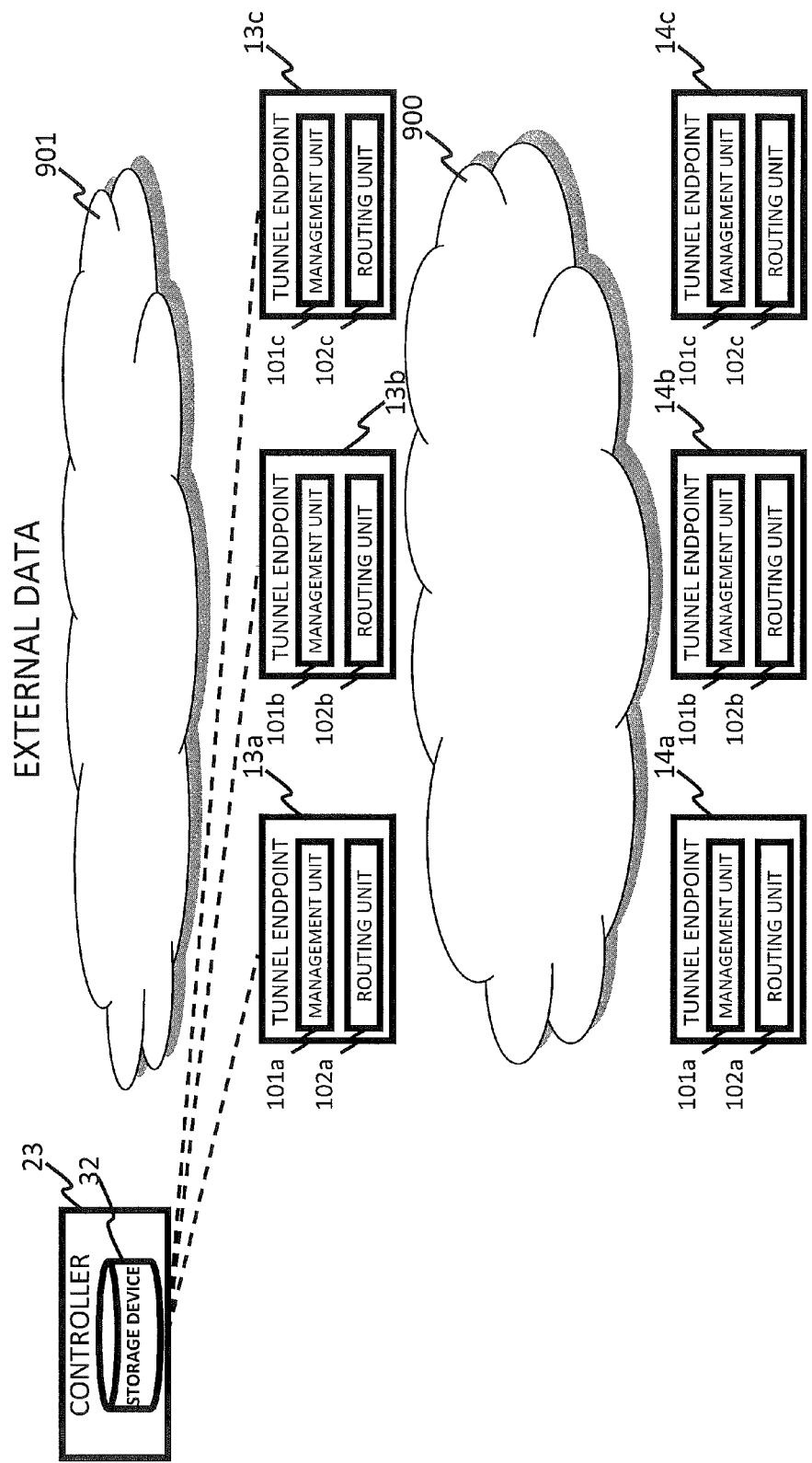
FIG. 19 illustrates a configuration according to a sixth exemplary embodiment of the present invention.

Next, a sixth exemplary embodiment will be described on the basis of a specific example. The sixth exemplary embodiment is applicable to a communication between IPsec tunnel endpoints. FIG. 19 illustrates a configuration according to the sixth exemplary embodiment of the present invention. As illustrated in FIG. 19, the configuration includes tunnel endpoints 13a to 13c, tunnel endpoints 14a to 14c arranged to face the tunnel endpoints 13a to 13c via the network 900, and a controller 23 that controls the tunnel endpoints 13a to 13c.

The tunnel endpoint 13a to 13c include interfaces (not illustrated) that communicate with the controller 23, management units 101a to 101c that control IPsec tunnel communications, and routing units 102a to 102c, respectively. Likewise, the tunnel endpoints 14a to 14c include management units 101a to 101c that control IPsec tunnel communications and routing units 102a to 102c, respectively.

The management units 101a to 101c manage SA (Security Association) information used for IPsec and provides the respective routing units 102a to 102c with information necessary for performing encryption/decryption. In addition, the management units 101a to 101c in the respective tunnel endpoints 13a to 13c have a function of communicating with the controller 23 to register the SA information in the controller 23 and receive a tunnel switching instruction from the controller 23. Thus, each of the management units 101a to 101c have a function corresponding to the interface 101 and the control unit 102 in a tunnel endpoint 10 according to the above first exemplary embodiment.

The SA information includes tunnel setting information about an IPsec tunnel and the like, an encryption/authentication algorithm for intercommunication, a secret key for encryption/authentication, a lifetime, a sequence number, and so on.

The routing units 102a to 102c transmit and receive communication data via IPsec tunnels, respectively.

Figure 20:
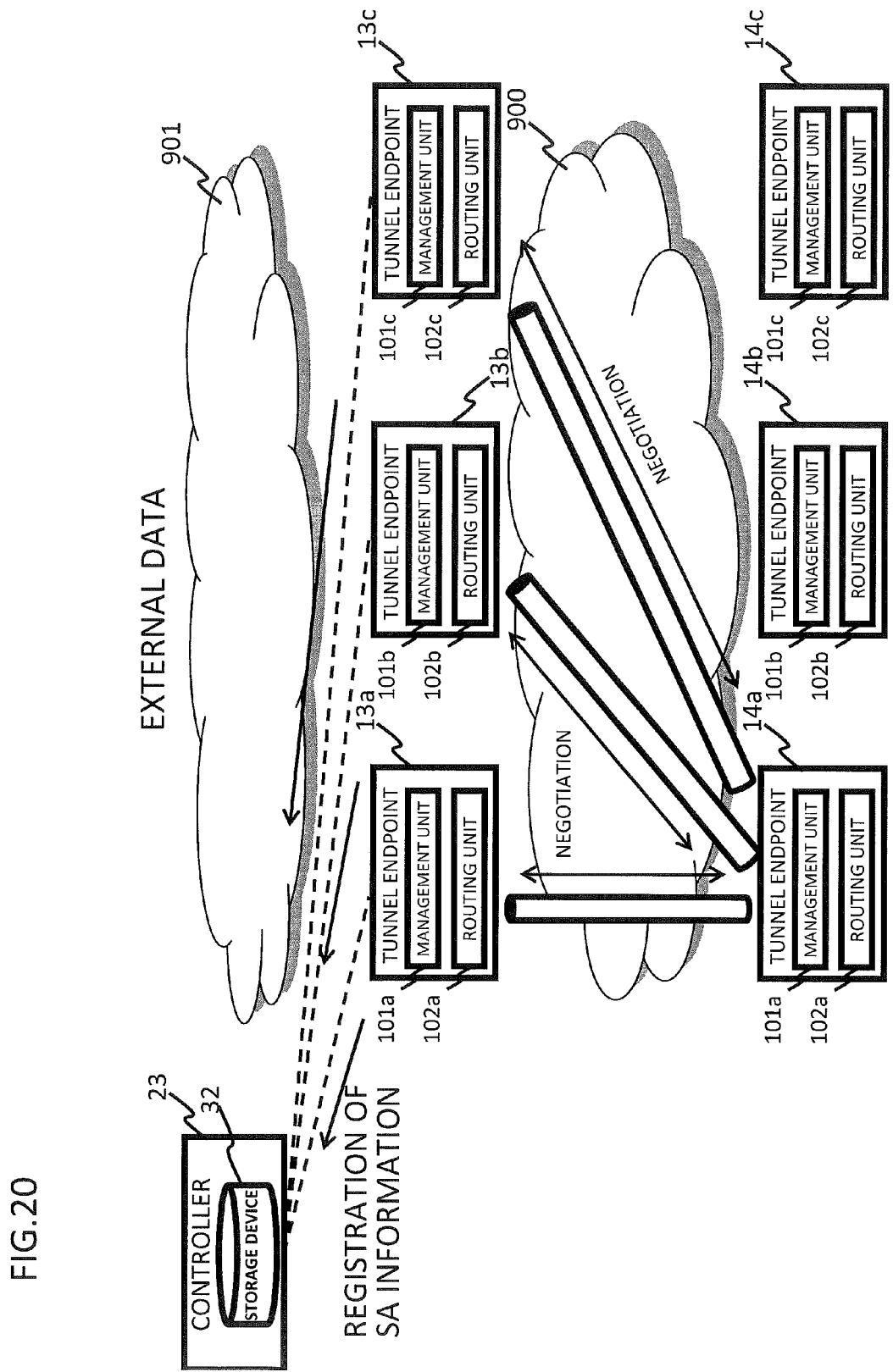
FIG. 20 illustrates an operation (a negotiation and registration of SA information) according to the sixth exemplary embodiment of the present invention.

Next, an operation according to the present exemplary embodiment will be described in detail with reference to FIGS. 20 to 24. FIG. 20 illustrates a state in which negotiations are performed and tunnels are set between the tunnel endpoint 14a and the tunnel endpoints 13a to 13c. As a result of the negotiations, the tunnel endpoint 13a to 13c register created SA information in the controller (hereinafter, information obtained through a negotiation with a tunnel endpoint 14X will be referred to as tunnel setting information x, IKE SAx, and IPsec SAx).

Figure 21:
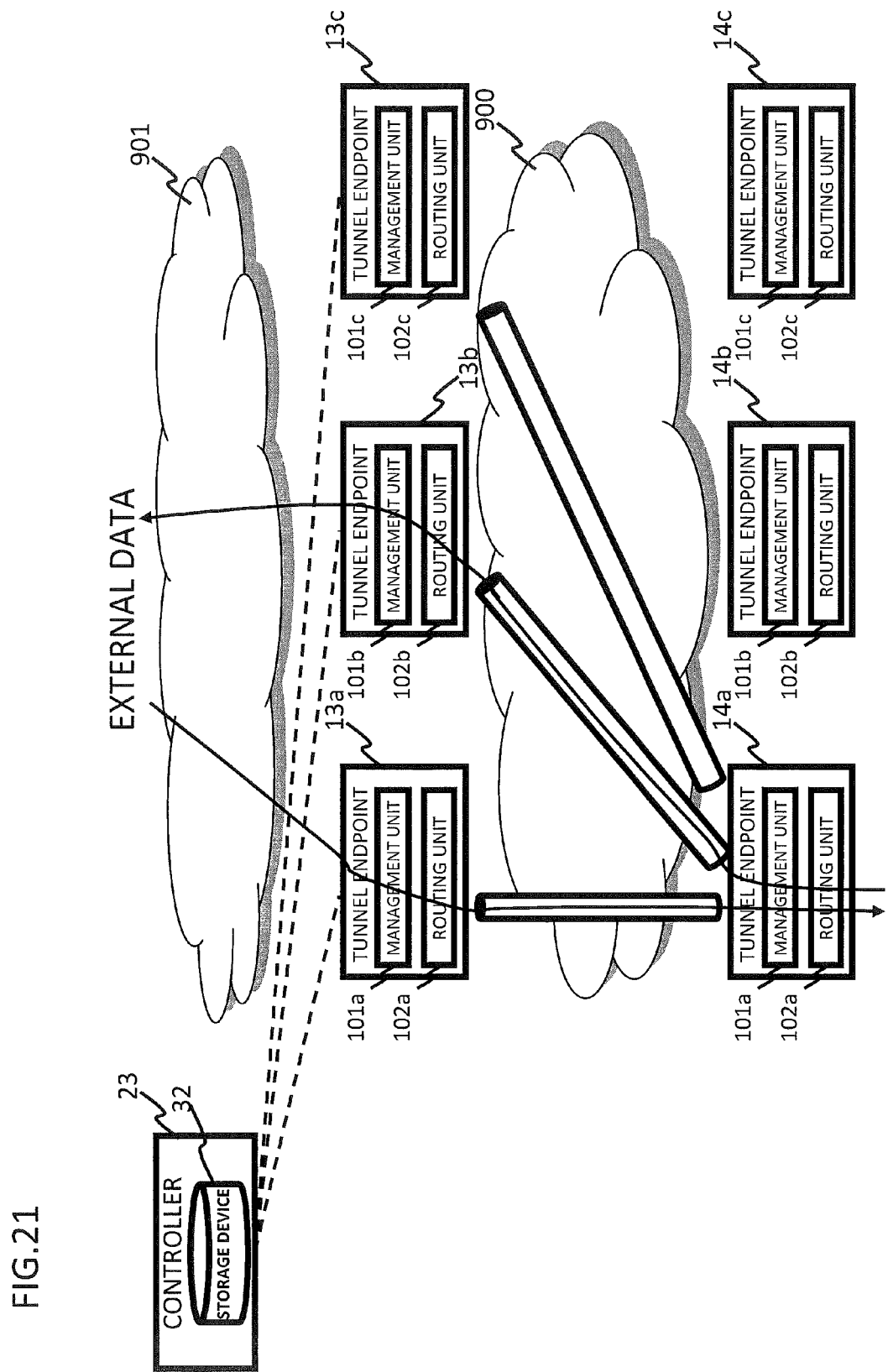
FIG. 21 illustrates an operation (an example of use of tunnels) according to the sixth exemplary embodiment of the present invention.

FIG. 21 illustrates data transmission and reception using the tunnels set in the above way. In FIG. 21, seen from a network 901, the tunnel endpoint 13a is operated as a dedicated endpoint for transmitting external data, the tunnel endpoint 13b is operated as a dedicated endpoint for receiving the external data, and the tunnel endpoint 13c is operated as a backup. In this way, load balancing and redundancy can be achieved.

Figure 22:
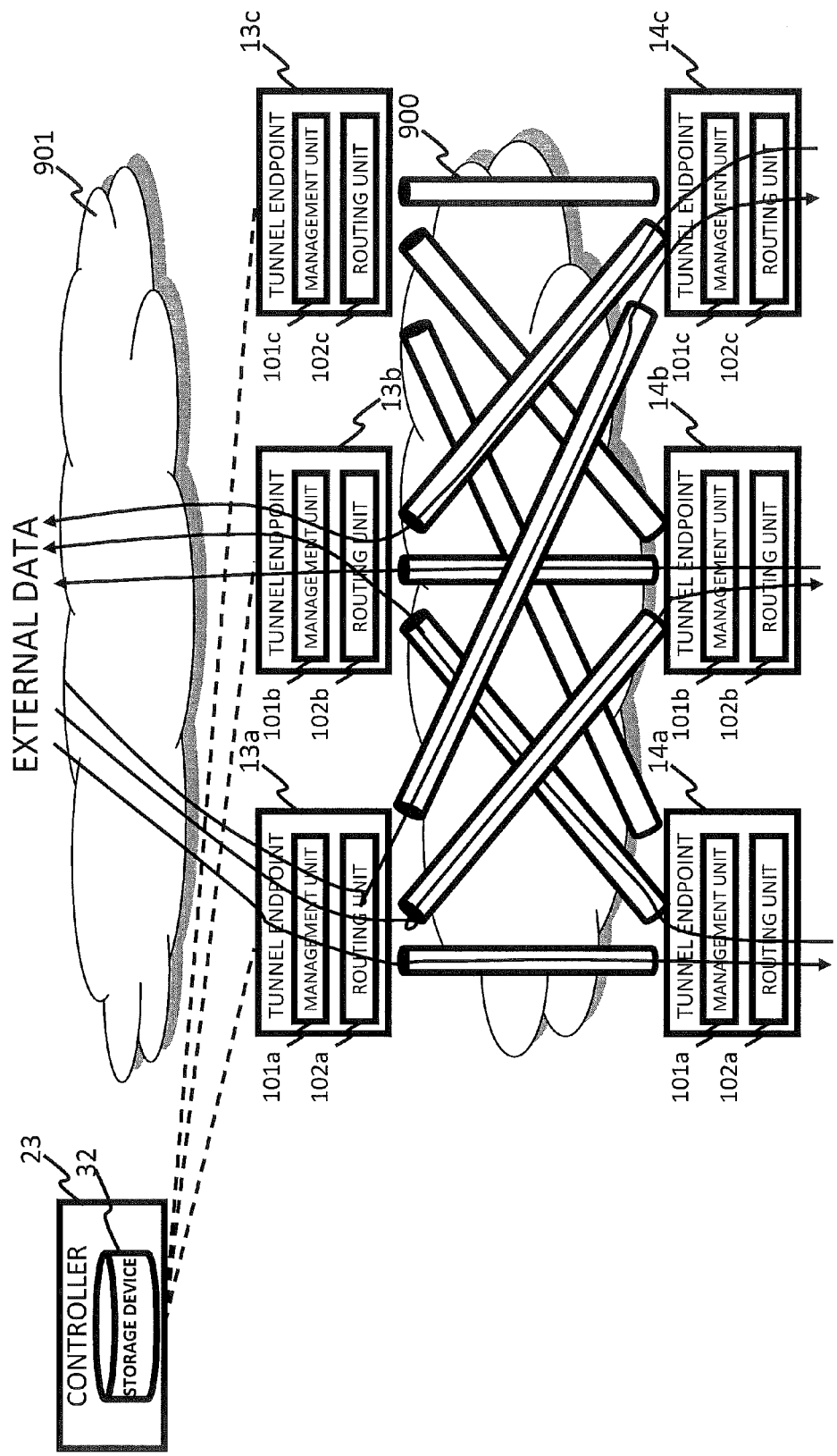
FIG. 22 illustrates an operation (an example of use of tunnels) according to the sixth exemplary embodiment of the present invention.

Likewise, negotiations are performed and tunnels are established between the tunnel endpoints 14b and 14c and the tunnel endpoints 13a to 13c, as illustrated in FIG. 22. As a result of the negotiations, the tunnel endpoints 13a to 13c register created SA information in the controller. In this way, the tunnel setting information a to c, IKE SA a to c, IPsec SA a to c obtained by the negotiations with the tunnel endpoints 14a to 14c are registered in a storage device 32 in the controller 23.

In the present exemplary embodiment, an anti-replay function is used in an IPsec communication. In this case, a sequence number attached to each packet is important. Thus, in the present exemplary embodiment, each time the tunnel endpoint 13a transmits a sequence number, the tunnel endpoint 13a transmits the sequence number to the controller 23. In addition, each time the tunnel endpoint 13b receives a sequence number, the tunnel endpoint 13b transmits the sequence number to the controller 23. In this way, the sequence numbers relating to the relevant tunnels stored in the storage device 32 in the controller 23 are updated.

Figure 23:
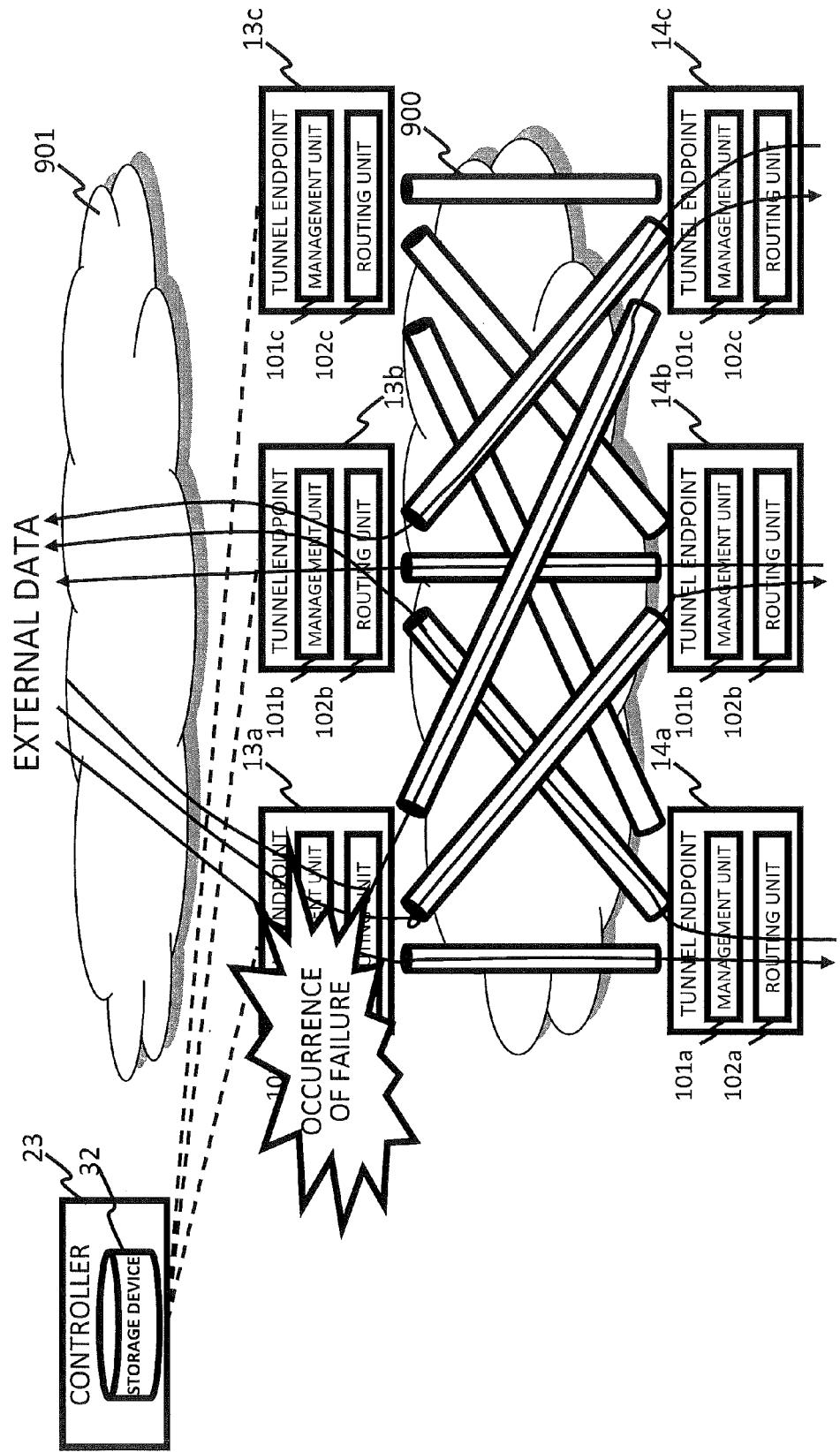
FIG. 23 illustrates a state in which a failure is caused in a tunnel endpoint according to the sixth exemplary embodiment of the present invention.
Figure 24:
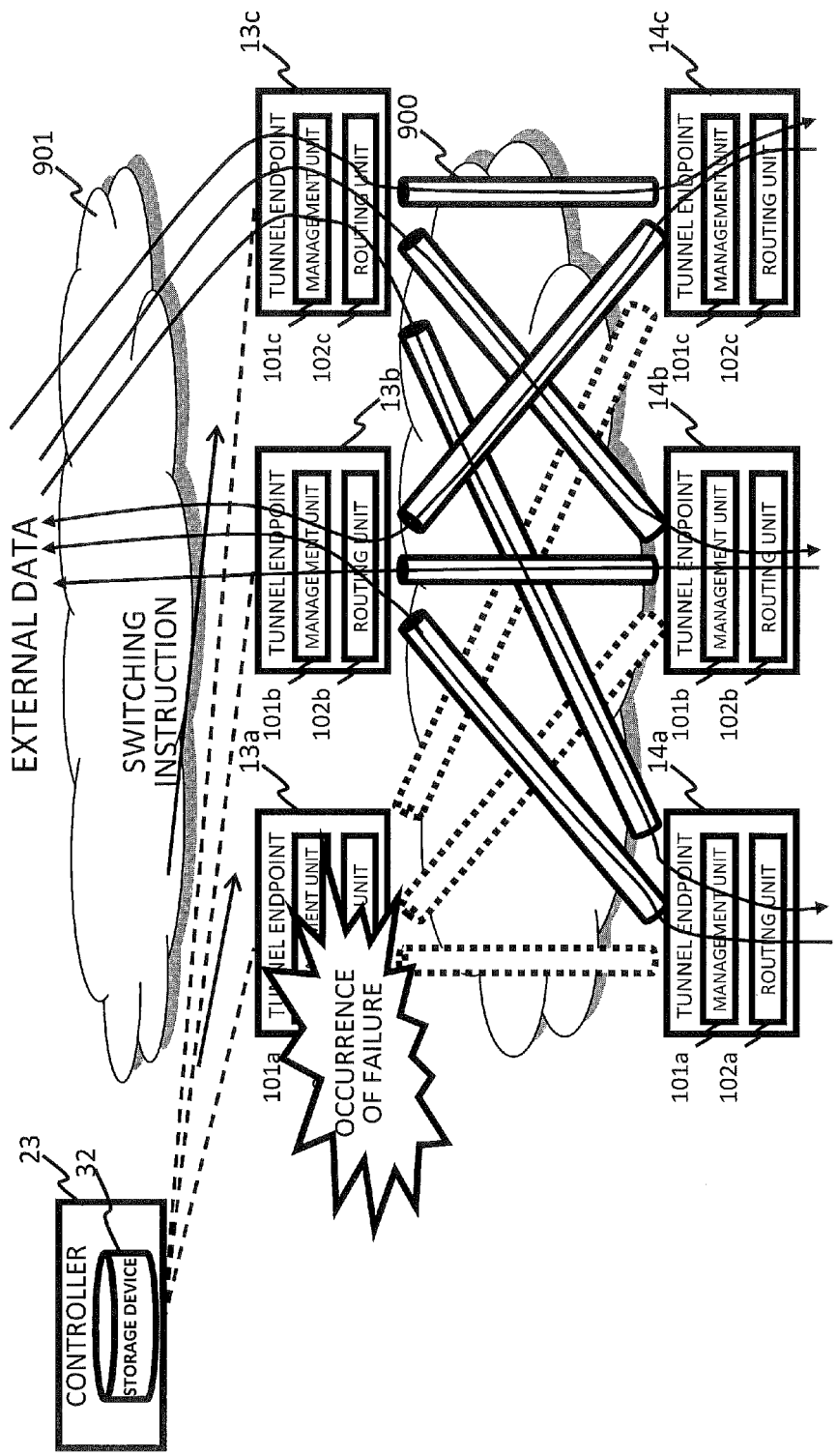
FIG. 24 illustrates an operation (switching of tunnels) according to the sixth exemplary embodiment of the present invention.

FIG. 23 illustrates a state in which a failure is caused in the tunnel endpoint 13a after the communications are started in the state in FIG. 22. If a failure is caused in the tunnel endpoint 13a and the controller 23 detects the failure, the controller 23 instructs the relevant tunnel endpoints to switch the tunnel endpoint 13a to the tunnel endpoint 13c, as illustrated in FIG. 24. The tunnel endpoint 13c acquires the necessary sequence numbers in the SA information from the controller 23 and uses the sequence numbers to continue the communications that have been performed by the tunnel endpoint 13a. The controller 23 can detect the failure by regularly transmitting a status monitoring packet to the tunnel endpoints 13a to 13c or by receiving link failure information from any one of the other tunnel endpoints.

Thus, according to the present exemplary embodiment, tunnel endpoints share tunnel setting information such as about IPsec tunnels and SA information, for example. In this way, tunnel communications such as IPsec can be freely developed, and load balancing and redundancy switching can be achieved.

In the above exemplary embodiment, the tunnel endpoint 13a is used as a dedicated endpoint for transmitting external data, the tunnel endpoint 13b is used as a dedicated endpoint for receiving the external data, and the tunnel endpoint 13c is used as a backup. However, the present invention is not limited to such mode. Seen from a user using the tunnel endpoint 13b, the tunnels that extend to the tunnel endpoint 13a may be used as the dedicated tunnels for receiving the data, the tunnels that extend to the tunnel endpoint 13b may be used as the dedicated tunnels for transmitting the data, and the tunnel endpoint 13c may be used as a backup. Namely, settings can be changed per tunnel endpoint.

In the above example, tunnel switching is performed when a failure is caused. However, tunnel switching may also be performed in other cases. For example, when the controller 23 checks the amount of traffic or power consumption, if the load on the entire network is low, the controller 23 may perform tunnel switching so that the data through all the IPsec tunnels can be transmitted and received by a single tunnel endpoint (for example, the tunnel endpoint 13a). In addition, for example, the tunnel endpoint 13b may be used as a backup and the power supply of the tunnel endpoint 13c may be turned off to achieve power saving of the entire network.

In contrast, if the load on the entire network is increased and an additional tunnel endpoint needs to be installed, after the additional tunnel endpoint is installed, the controller 23 may supply the SA information about the tunnel endpoints 13a to 13c already installed to the additional tunnel endpoint and switch the tunnels so that the load on the entire network can be distributed. In this way, the additional tunnel endpoint can be operated smoothly.

In addition, the present invention is also applicable to when a tunnel endpoint is replaced. For example, first, the communication data passing through the tunnel endpoint 13a is distributed to the tunnel endpoints 13b and 13c. Next, when it is confirmed that no communication data passes through the tunnel, endpoint 13a, the tunnel endpoint 13a is replaced by a tunnel endpoint 13a'. After the tunnel endpoint 13a is replaced, the SA information distributed to the tunnel endpoints 13b and 13c is supplied to the tunnel endpoint 13a' that has been installed in place of the tunnel endpoint 13a. In this way, replacement work is completed.

[Seventh Exemplary Embodiment]

Next, a seventh exemplary embodiment obtained by changing the above sixth exemplary embodiment will be described. Since the basic configuration and operation are similar to those according to the sixth exemplary embodiment, the following description will be made with a focus on the differences.

FIG. 25 illustrates updated information about the sequence numbers transmitted from the tunnel endpoints 13a and 13b as the communication state information per tunnel. In FIG. 25, the information includes addresses of tunnel starting and ending points, an SPI (a security parameter index) which is an IPsec SA identification number, sequence numbers updated by the corresponding SPI number, and times when the respective sequence numbers are updated. In the present exemplary embodiment, each time a communication is generated, the tunnel endpoints 13a to 13c and the tunnel endpoints 14a to 14c transmit communication state information per tunnel to the controller 23.

When receiving the updated information about the sequence numbers illustrated in FIG. 25, the controller 23 recognizes that the controller 23 has received the sequence numbers including the latest sequence number (sequence number N+M in FIG. 25) for tunnel switching. Next, the controller 23 transmits SA information in which these sequence numbers are updated to the tunnel endpoints 13b and 13c.

Figure 26:
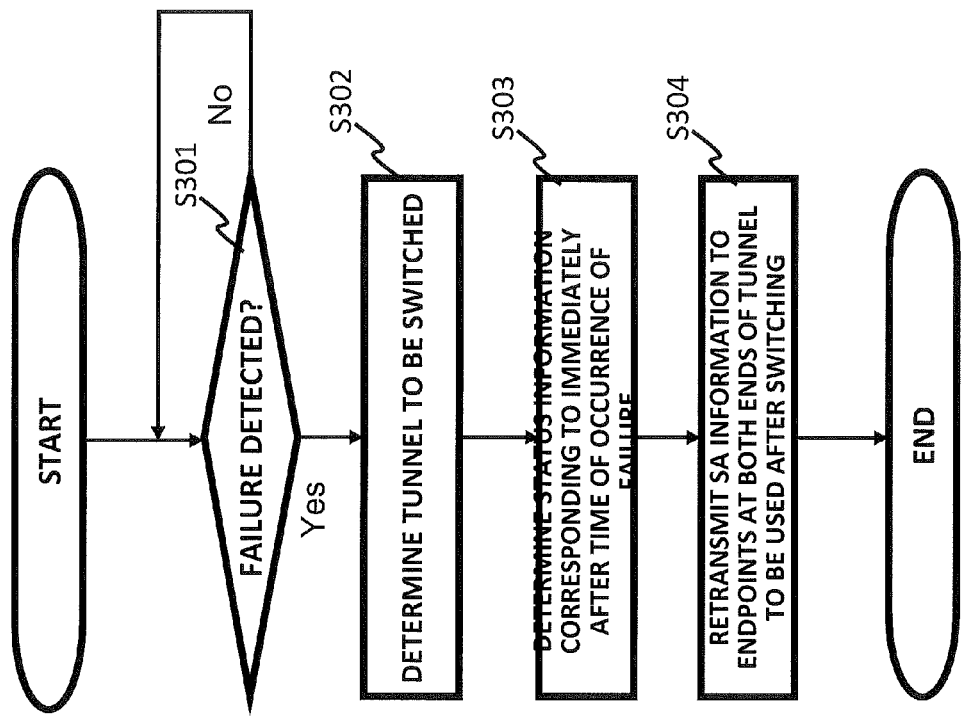
FIG. 26 is a flowchart illustrating an operation of the controller according to the seventh exemplary embodiment of the present invention.

FIG. 26 is a flowchart illustrating an operation of the controller 23 performed when a failure is caused. The controller 23 determines whether the controller 23 has detected a failure in any one of the tunnel endpoints 13a to 13c (step S301). If the controller 23 detects a failure (Yes in step S301), the controller 23 determines an IPsec tunnel that is affected by the failure, namely, an IPsec tunnel that needs to be switched (step S302).

Next, the controller 23 determines a sequence number whose update time is immediately after the time of occurrence of the failure from the SA information about the determined IPsec tunnel (step S303).

Next, the controller 23 retransmits the SA information including the determined sequence number to the tunnel endpoints located at both ends of the tunnel to be used after the switching (step S304).

Figure 27:
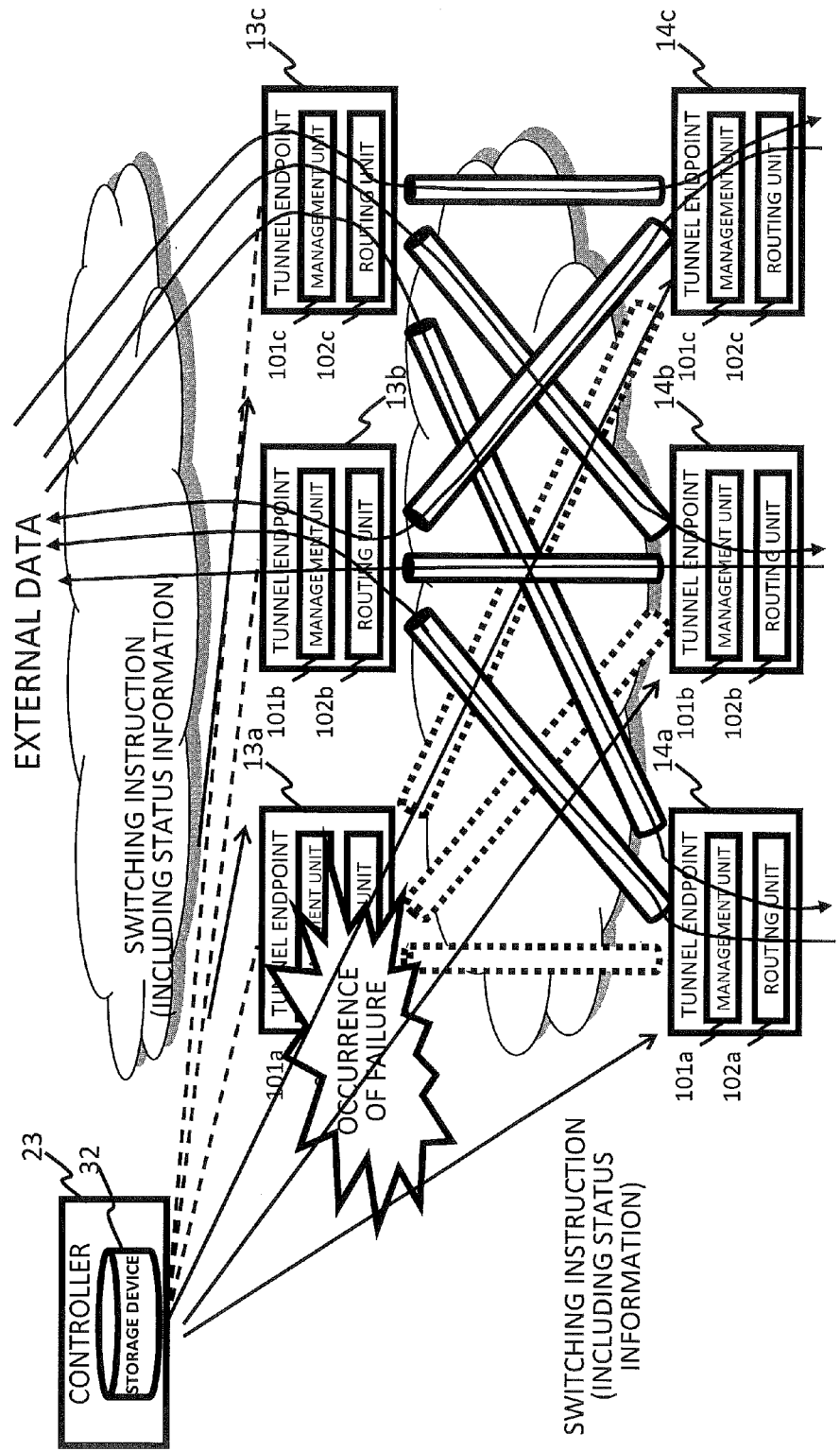
FIG. 27 illustrates an operation performed when a failure is caused according to the seventh exemplary embodiment of the present invention.

FIG. 27 illustrates an operation according to the present exemplary embodiment. Seen from the network 901, the tunnel endpoint 13a is operated as a dedicated endpoint for transmitting external data, the tunnel endpoint 13b is operated as a dedicated endpoint for receiving the external data, and the tunnel endpoint 13c is operated as a backup.

As described above, in the present exemplary embodiment, the tunnel endpoints 13a and 13b and 14a to 14c transmit the sequence number update information to the controller 23 (at this point, the tunnel endpoint 13c is a backup and no communication is performed thereby.). The sequence numbers transmitted from the tunnel endpoints 14a to 14c to the controller 23 include sequence number S1 of the packets received from the tunnel endpoint 13a. Thus, if a failure is caused in the tunnel endpoint 13a and the tunnel endpoint 13c is switched to a dedicated endpoint for transmitting the external data, the tunnel endpoint 13c uses the sequence number S1 transmitted from the tunnel endpoints 14a to 14c. In this way, since the tunnel endpoint 13c can continue the transmission while maintaining consecutive sequence numbers, a window size displayed when the anti-replay function is used can be reduced. As a result, the confidentiality can be increased.

As described above, according to the present exemplary embodiment, a tunnel endpoint newly used after switching can be used from a sequence number corresponding to immediately after occurrence of a failure. Thus, the receiving-end device can operate with consecutive sequence numbers.

While various exemplary embodiments of the present invention have been described, the present invention is not limited thereto. Further variations, substitutions, or adjustments can be made without departing from the basic technical concept of the present invention. For example, a network configuration, each element configuration, a message display mode illustrated in each drawing are examples to facilitate understanding of the present invention. Namely, the present invention is not limited to the configurations illustrated in the drawings.

Figure 28:
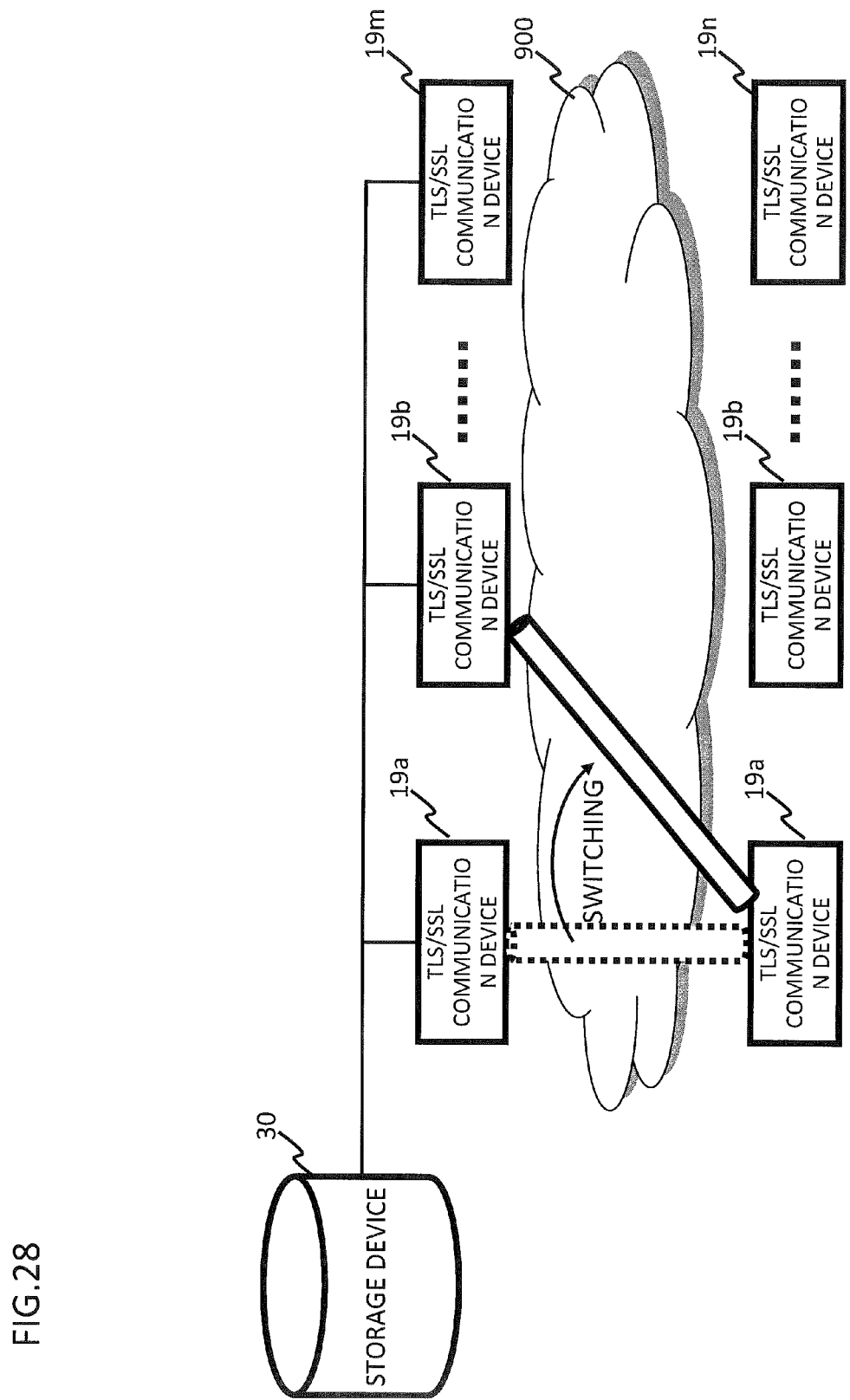
FIG. 28 illustrates an eighth exemplary embodiment of the present invention.

In addition, as is clear from the above first to seventh exemplary embodiments, the present invention is equally applicable to modes other than IPsec tunnels. For example, the present invention is applicable to TLS/SSL (Transport Layer Security/Secure Sockets Layer) and the like in which a prior negotiation is performed between communication devices (see FIG. 28; eighth exemplary embodiment).

In addition, each of the units (processing means) in the tunnel endpoints and the controllers illustrated in the above drawings can be realized by a computer program that causes a computer constituting these devices to use hardware of the computer and to execute each processing described above.

Finally, suitable modes of the present invention will be summarized.

[First Mode]

(See the tunnel endpoint device according to the above first aspect)

[Second Mode]

The tunnel endpoint device according to the first mode;
wherein the control unit is capable of continuing the tunnel communication of the another tunnel endpoint device by using the communication state information.

[Third Mode]

The tunnel endpoint device according to the first or second mode;
wherein the control unit is capable of allowing another tunnel endpoint device to continue a communication via the communication tunnel by writing communication state information in the storage device via the interface.

[Fourth Mode]

The tunnel endpoint device according to any one of the first to third modes;
wherein the tunnel endpoint device performs communication tunnel switching that involves change of a tunnel destination endpoint when receiving a tunnel destination endpoint switching instruction from a controller that manages communication tunnels among endpoint devices.

[Fifth Mode]

The tunnel endpoint device according to any one of the first to fourth modes;
wherein a switch that operates in accordance with control instructions from the controller is arranged between the first and second tunnel endpoint devices; and
wherein the controller performs the tunnel switching by instructing the switch to change the forwarding destination of the communication.

[Sixth Mode]

The tunnel endpoint device according to any one of the first to fourth modes;
wherein the tunnel endpoint device is capable of establishing a communication tunnel and continuing a communication using the communication tunnel by reading security association information including communication state information written in the storage device.

[Seventh Mode]

(See the server according to the above second aspect)

[Eighth Mode]

(See the controller according to the third aspect)

[Ninth Mode]

(See the communication device according to the above fourth aspect)

[Tenth Mode]

(See the communication method according to the above fifth aspect)

[Eleventh Mode]

(See the communication method according to the above sixth aspect)

[Twelfth Mode]

(See the program according to the above seventh aspect)

The above seventh to twelfth modes can be extended to the second to sixth modes, as with the first mode.

The disclosure of the above Patent Literatures and Non-Patent Literatures is incorporated herein by reference thereto. Modifications and adjustments of the exemplary embodiments and the examples are possible within the scope of the overall disclosure (including the claims) of the present invention and based on the basic technical concept of the present invention. In addition, various combinations and selections of various disclosed elements (including the elements in each of the claims, exemplary embodiments, examples, drawings, etc.) are possible within the scope of the disclosure of the present invention. Namely, the present invention of course includes various variations and modifications that could be made by those skilled in the art according to the overall disclosure including the claims and the technical concept. In particular, the present description discloses numerical value ranges. However, even if the description does not particularly disclose arbitrary numerical values or small ranges included in the ranges, these values and ranges should be deemed to have been specifically disclosed.

What is claimed is:

1. A tunnel endpoint device, comprising:
a control unit configured to establish a communication tunnel with a tunnel endpoint device as a communication peer; and
an interface configured to access a storage device including communication state information about a tunnel communication,
wherein the control unit takes over state information about a tunnel communication of another tunnel endpoint device via the storage device when receiving an externally supplied switching instruction, and
wherein the communication state information about the tunnel communication comprises security association information.

2. The tunnel endpoint device according to claim 1, wherein the control unit continues the tunnel communication of the another tunnel endpoint device by using the communication state information.

3. The tunnel endpoint device according to claim 1, wherein the control unit allows the another tunnel endpoint device to continue a communication via the communication tunnel by writing communication state information in the storage device via the interface.

4. The tunnel endpoint device according to claim 1, wherein the tunnel endpoint device performs communication tunnel switching that involves a change of a tunnel destination endpoint when receiving a tunnel destination endpoint switching instruction from a controller that manages communication tunnels among endpoint devices.

5. The tunnel endpoint device according to claim 2, wherein the control unit allows another tunnel endpoint device to continue a communication via the communication tunnel by writing the communication state information in the storage device via the interface.

6. The tunnel endpoint device according to claim 2, wherein the tunnel endpoint device performs communication tunnel switching that involves change of a tunnel destination endpoint when receiving a tunnel destination endpoint switching instruction from a controller that manages communication tunnels among endpoint devices.

7. The tunnel endpoint device according to claim 3, wherein the tunnel endpoint device performs communication tunnel switching that involves change of a tunnel destination endpoint when receiving a tunnel destination endpoint switching instruction from a controller that manages communication tunnels among endpoint devices.

8. The tunnel endpoint device according to claim 1, wherein the security association information includes information for performing encryption/decryption.

9. The tunnel endpoint device according to claim 1, wherein the security association information includes information for performing a Security Architecture for Internet Protocol (IPsec).

10. A communication device, comprising:
a communication unit configured to perform an encryption communication by using a specified encryption protocol with a first communication device; and
an interface configured to access a storage device in which a second communication device that communicates with the first communication device writes information about an encryption communication including encryption protocol information;
wherein the communication unit continues an encryption communication with the first communication device in place of the second communication device by reading the information about the encryption communication from the storage device when receiving an externally supplied switching instruction, and
wherein the information about the encryption communication includes security association information.

11. A communication method, comprising:
receiving, by a tunnel endpoint device, which includes a control unit configured to establish a communication tunnel with a tunnel endpoint device as a communication peer and an interface configured to access a storage device including communication state information about a tunnel communication, an externally supplied communication tunnel switching instruction; and
taking over, by the tunnel endpoint device, state information about a tunnel communication of another tunnel endpoint device via the storage device when receiving the externally supplied switching instruction,
wherein the state information about the tunnel communication comprises security association information.

12. A communication method, comprising:
determining, by a controller, which includes a management unit that transmits an instruction to a first tunnel endpoint device that performs a tunnel communication with a communication peer and a control unit that controls a second tunnel endpoint device via the management unit, whether to instruct the second tunnel endpoint device to take over an operation of a tunnel communication; and
instructing, by the controller, the second tunnel endpoint device to take over communication state information about the tunnel communication of the first tunnel endpoint device and the operation of the tunnel communication,
wherein the tunnel communication includes communication state information about the tunnel communication including security association information.

13. A computer-readable non-transitory storage medium storing a program, causing a computer, which includes a management unit that transmits an instruction to a first tunnel endpoint device that performs a tunnel communication with a communication peer and a control unit that controls a second tunnel endpoint device via the management unit, to perform processing for:
determining whether to instruct the second tunnel endpoint device to take over an operation of a tunnel communication; and
when it is determined to instruct the second tunnel endpoint device to take over an operation of a tunnel communication, instructing the second tunnel endpoint device to take over communication state information about the tunnel communication of the first tunnel endpoint device and the operation of the tunnel communication,
wherein the communication state information about the tunnel communication including security association information.

14. A controller, comprising:
a management unit that transmits an instruction to a first tunnel endpoint device that performs a tunnel communication with a communication peer;
a control unit that controls a second tunnel endpoint device via the management unit,
wherein the control unit instructs the second tunnel endpoint device to take over communication sate information about the tunnel communication of the first tunnel endpoint device and an operation of the tunnel communication, and
wherein the communication state information about the tunnel communication comprises security association information.

15. The controller according to claim 14, wherein the management unit manages communication state information about a plurality of tunnel endpoint devices by using a storage device.

16. The controller according to claim 14, wherein the control unit instructs switching of a predetermined tunnel communication from the first tunnel endpoint device to the second tunnel endpoint device via the management unit.

17. The controller according to claim 15, wherein the control unit instructs switching of a predetermined tunnel communication from the first tunnel endpoint device to the second tunnel endpoint device via the management unit.

18. The controller according to claim 14, wherein the security association information includes information for performing encryption/decryption.

19. A server, comprising:
a first unit that operates a plurality of virtual machines each of which performs a tunnel communication with a communication peer; and
a second unit that switches virtual machines performing a predetermined tunnel communication,
wherein the first unit allows a second virtual machine to take over state information about a tunnel communication of a first virtual machine when receiving an externally supplied switching instruction, and
wherein the state information about the tunnel communication includes security association information.

20. A controller, comprising:
a management unit that transmits an instruction to a server that operates a plurality of virtual machines each of which is performs a tunnel communication with a communication peer; and
a control unit that controls the server via the management unit;
wherein the control unit instructs a first virtual machine included in the server to allow a second virtual machine to take over state information about a tunnel communication of the first virtual machine, and
wherein the state information about the tunnel communication includes security association information.

* * * * *